United States Patent
Snider, Sr.

(10) Patent No.: US 10,698,980 B2
(45) Date of Patent: Jun. 30, 2020

(54) METHODS FOR CONSTRUCTING SURFACES FOR OPTIMIZING FLUID FLOW

(71) Applicant: John Michael Snider, Sr., Clinton, TN (US)

(72) Inventor: John Michael Snider, Sr., Clinton, TN (US)

(*) Notice: Subject to any disclaimer, the term of this patent is extended or adjusted under 35 U.S.C. 154(b) by 442 days.

(21) Appl. No.: 15/289,292

(22) Filed: Oct. 10, 2016

(65) Prior Publication Data

US 2017/0103151 A1 Apr. 13, 2017

Related U.S. Application Data

(60) Provisional application No. 62/239,876, filed on Oct. 10, 2015.

(51) Int. Cl.
*G06F 17/50* (2006.01)
*E21B 29/08* (2006.01)

(52) U.S. Cl.
CPC .......... *G06F 17/5018* (2013.01); *E21B 29/08* (2013.01); *G06F 17/5009* (2013.01); *G06F 2217/16* (2013.01)

(58) Field of Classification Search
CPC ............. G06F 17/5018; G06F 2217/16; G06F 17/5009; E21B 29/08
USPC ............................................................ 703/2
See application file for complete search history.

(56) References Cited

U.S. PATENT DOCUMENTS

| | | | |
|---|---|---|---|
| 7,209,873 B1 | 4/2007 | Kliegel | |
| 7,765,090 B2 | 7/2010 | Nakayama et al. | |
| 9,037,440 B2 | 5/2015 | Sun et al. | |
| 2003/0055580 A1* | 3/2003 | Normen | G01F 1/8418 702/45 |
| 2009/0234595 A1* | 9/2009 | Okcay | G01M 9/067 702/49 |
| 2013/0220443 A1* | 8/2013 | Landry | F16K 47/08 137/315.01 |
| 2014/0142908 A1* | 5/2014 | Tsunoda | G06F 17/5018 703/2 |

FOREIGN PATENT DOCUMENTS

WO  WO-2016044928 A1 *  3/2016  ............. C02F 1/325

* cited by examiner

*Primary Examiner* — Kamini S Shah
*Assistant Examiner* — Faraj Ayoub
(74) *Attorney, Agent, or Firm* — Pitts & Lake, P.C.

(57) ABSTRACT

A method of modeling fluid flow in a computational fluid dynamics model space in a way that tracks both linear and rotational position of the modeled flow in the model space by representing flow elements as resistors and resistor arrays having resistance valued relative to the fluid flow.

2 Claims, 9 Drawing Sheets

METHODS FOR CONSTRUCTING SURFACES FOR OPTIMIZING FLUID FLOW

CROSS-REFERENCE TO RELATED APPLICATIONS

This application claims the benefit of U.S. Provisional Patent Application Ser. No. 62/239,876, filed on Oct. 10, 2015, which is incorporated herein in its entirety by reference.

FIELD OF INVENTION

The present general inventive concept relates to constructing surfaces for optimizing fluid flow, and, more particularly, constructing surfaces according to fluid element spatial and rotational positions over time while moving relative to the surfaces.

BACKGROUND

Fluid dynamics originally was based purely on observation of flow phenomena. Early pioneers in the field observed water flowing and smoke rising. Mathematicians developed formulas that attempted to predict flow behavior around simple geometries such as a cylinder. In the early days of flight wind tunnels were constructed to test airfoil shapes for lift, drag, pitching moment, stall characteristics, and additional flight parameters. Others studied flow losses in pipes and ducts using testing and, for very low flows, mathematical models. In the 1970's and 1980's computers became powerful enough and available to a wide group of researchers, and the science of computational fluid dynamics began to grow into a field of study. Today these conventional models can "test" a foil design using a computer, and the results are verified in a wind tunnel. These Computational Fluid Dynamics (CFD) models are typically made in a four-dimensional mathematical space: time and the three principal directions. Within this space, tensor math is used to identify all of the stresses on a flow element in the space at each point in time. Matrices that contain state variables: pressure, density, velocity, temperature, and elemental forces are calculated by solving partial differential equations which conserve mass, momentum, and energy in the model space. Experience and skill of the model operator is required to divide the model space up into flow elements (this is called meshing) that produce results which match test data of actual flow. In regions of the model with large velocity gradients, turbulence will occur. Wikipedia defines turbulence or turbulent flow in fluid dynamics as a flow regime characterized by chaotic property changes, including low momentum diffusion, high momentum convection, and rapid variation of pressure and flow velocity in space and time.

In a turbulent portion of the model the state variables will be in a state of complete confusion and disorder. Many schemes and methods have been developed to attempt to model flow behavior in these regions, most of which focus on the Reynolds decomposition, a mathematical technique to separate the average and fluctuating parts of a quantity. When applied to the governing flow equations, this is called Reynolds-averaged Navier-Stokes equations (RANS). Various models of turbulence are then used with RANS to model turbulence. Popular turbulence models include One-Equation Models such as Spalart-Allmaras and Nut-92; Two-Equation Models such as Menter k-omega SST, Menter k-omega BSL, Wilcox k-omega, Chien k-epsilon, K-kL, and Explicit Algebraic Stress k-omega; Three-Equation Models include K-e-Rt; Three-Equation Models plus Elliptic Relaxation include K-e-zeta-f; Seven-Equation Omega-Based Full Reynolds Stress Models include Wilcox Stress-omega and SSG/LRR; and Seven-Equation Epsilon-Based Full Reynolds Stress Models include GLVY Stress-epsilon.

These efforts have not been fully satisfactory. Further, to implement the models a modeler must have considerable experience and skill to choose the proper turbulence model for a particular problem, its best meshing requirements, how to run the model to best exploit the model, and must know the approximate answer before starting. Thus, a more convenient and efficient method for constructing surfaces for optimizing the fluid flow relative to those surfaces would be beneficial.

BRIEF SUMMARY

According to various example embodiments of the present general inventive concept, a method may be provided by which fluid flow may be modeled in a computational fluid dynamics model space in a way that tracks both linear and rotational position of the modeled flow in the model space by representing flow elements as resistors and resistor arrays having resistance valued relative to the fluid flow.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by method of constructing a body to optimize a fluid flow over a surface of the body, the method including defining a control volume in which a fluid flow moves over at least a portion of a surface of a body, the control volume having an inlet and an outlet, setting initial conditions in the control volume, determining flow profiles of areas between the inlet and outlet of the control volume, identifying flow elements associated with changes in flow fluid velocity, assigning flow resistors to the flow elements associated with the changes in flow fluid velocity, wherein resistive values of the flow resistors correspond to flow characteristics causing the changes in flow fluid velocity, determining new conditions according to the flow resistors in the control volume for a desired number of subsequent time intervals, including adjusting the flow resistors according to the new conditions of each time interval to reflect changes in the flow fluid velocity, and modifying parameters of the body to adjust vortexes in the fluid flow through the control volume according to the flow resistors.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of various example embodiments, with reference to the accompanying drawings in which.

DETAILED DESCRIPTION

Figure 1:
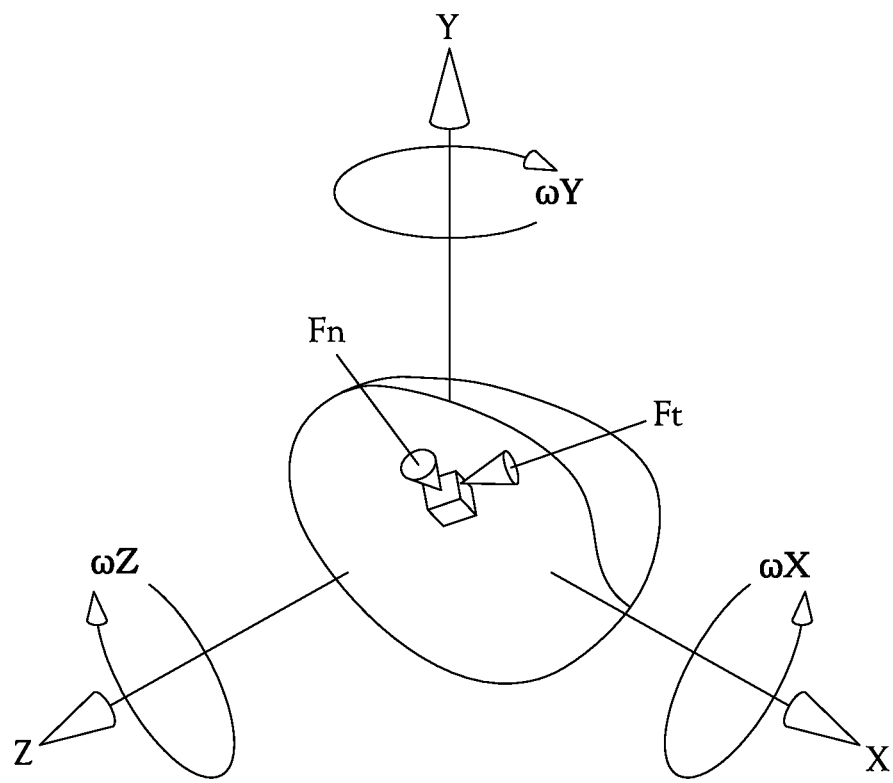
FIG. 1 illustrates the forces acting on an arbitrary fluid element.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

In various example embodiments of the present general inventive concept described herein, it will be shown that a key aspect of fluid behavior has not been included in previous models, and that by including it, model performance will be greatly improved and turbulence can be modeled directly without a large increase in computational resources. First, the methods used before will be further explored. These methods are based on the Navier-Stokes equations. Navier-Stokes sums all of the forces a fluid element (as referred to herein, an element is a small portion of the fluid) is exposed to. The sum of all of these forces is zero, which is a development of Newton's Third Law: "For every action, there is an equal and opposite reaction." These forces are: inertial forces, pressure forces, viscous forces, gravitational forces, and others (electro-magnetic and other nuclear forces). These other forces can be ignored since they are very small relative to the other four. So the four forces that are considered in incompressible no heat transfer fluid dynamics problems are shown in Equation 1:

$$\Sigma F = 0 = \text{mass} \times \text{acceleration} + \text{pressure} + \text{viscous} + \text{gravitational} \quad \text{(Equation 1)}$$

Or, in mathematical form, in Equation 2:

$$0 = ma + P_1 A_1 + P_2 A_2 + \mu A_\perp dv_\perp + \rho A_h g \delta h \quad \text{(Equation 2)}$$

In Equation 2, $dv_\perp$ and $A_\perp$ indicate the velocity gradient and Area perpendicular to the flow direction. $A_h$ is the horizontal area of the element. Note that the pressure force has been split into two, hence the five terms listed above.

Three of the four forces are produced by stresses on an element in the model space. The inertial term opposes the sum of the forces caused by stresses. Stress is a pressure acting over and perpendicular to an area. Shear stress is a distributed force acting along and parallel to the surface of an area. A cube shaped element in the model space has six faces, so there would be six stresses and six shear stresses. The six shear stresses require orientation of the direction of the shear stress on each of the faces which adds two more components to characterize the direction of each shear stress. Thus eighteen values are required to fully define the stress on the cubical element. Tensor math, a mathematical notation for defining a point in three dimensional mathematical spaces and its stresses and shear stress, locates the element. For each element, matrices (tables of values) are used to hold the stresses on the element as well as other elemental state variables.

From the matrices of stresses, the forces acting on the element may be calculated using the area of the elements faces. These forces are entered into the conservation equations to calculate new forces and position over a time period. Then the new forces are converted back to stresses, and the matrices updated with new values for the next time step. In this way a flow field is modeled over space and time. The Conservation of mass, momentum, and energy equations are used to calculate the new forces.

Conservation of mass dictates simply that the flow going into an element minus the flow going out is equal to the rate of change of mass within the element. Alternatively:

$$\text{any change in mass/time} = \text{mass flowing in} - \text{mass flowing out} \quad \text{(Equation 3)}$$

The mass flow in or out ($\dot{m}$) is equal to the density of the fluid times its velocity times the area perpendicular to the flow direction, as shown in Equation 4:

$$\dot{m} = \rho v A \quad \text{(Equation 4)}$$

This leads to Equation 5:

$$\frac{d\dot{m}}{dt} = \dot{m}_i - \dot{m}_o \quad \text{(Equation 5)}$$

Conservation of momentum and energy are applications of Newton's Second Law, which states that the force acting on an object is equal to the mass of the object times the acceleration of the object. If this force acts for an instant the acceleration occurs for an instant. Should the force last for an hour, for example, then the mass will undergo the acceleration for an hour. Obviously, the change in velocity will be different for different force durations. The momentum equation is derived by multiplying both sides of Newton's Equation (f=ma) by the change in time (δt), which yields: fδt=maδt. Force acting for a period in time is known as an impulse. Since acceleration is change in velocity per change in time, multiplying acceleration by time yields the change in velocity or δv. The quantity mass times velocity is known as momentum. Multiplying our element forces by the change in time (δt) yields the momentum equation.

Multiplying by δt results in Equation 6:

$$0 = ma\delta t - P_1 A_1 \delta t - P_2 A_2 \delta t - \mu A_\perp dv_\perp \delta t - \rho A_h g \delta h \delta t \quad \text{(Equation 6)}$$

Since maδt=mδv, this may be represented by Equation 7:

$$0 = m\delta v - P_1 A_1 \delta t - P_2 A_2 \delta t - \mu A_\perp dv_\perp \delta t - \rho A_h g \delta h \delta t \quad \text{(Equation 7)}$$

Dividing both sides of Equation 7 by δt results in Equation 8:

$$0 = \frac{m\delta v}{\delta t} - P_1 A_1 - P_2 A_2 - \mu A_\perp dv_\perp t - \rho A_h g \delta h \quad \text{(Equation 8)}$$

Since m/δt is mass flow rate the above becomes the familiar Equation 9:

$$0 = \dot{m}\delta v - P_1 A_1 - P_2 A_2 - \mu A_\perp dv_\perp - \rho A_h g \delta h \quad \text{(Equation 9)}$$

Or, alternatively, the mass in flow minus the mass out flow is equal to the sum of the forces acting on the body:

$$\dot{m}v_i - \dot{m}v_0 = P_1 A_1 + P_2 A_2 + \mu A_\perp dv_\perp + \rho A_h g \delta h \quad \text{(Equation 10)}$$

A second derivation of the momentum equation finds the pressure gradient as a function of position, as described below. Starting with the force equation times δt, which yields Equation 11:

$$0 = \rho V \delta v + \delta P A \delta t + \mu A_\perp dv_\perp \delta t + \rho A_h g \delta h \delta t \quad \text{(Equation 11)}$$

Dividing both sides of Equation 11 by A [note that (V≡volume)/(A≡area)=(δx≡change in length)] yields Equation 12:

$$0 = \rho \delta x \delta v + \delta P \delta t + \mu \frac{A_\perp}{A} dv_\perp \delta t + \rho \frac{A_h}{A} g \delta h \delta t \quad \text{(Equation 12)}$$

Since δx/δt is defined as velocity (v), dividing Equation 12 by δt yields:

$$0 = \rho v \delta v + \delta P + \mu \frac{A_\perp}{A} dv_\perp + \rho \frac{A_h}{A} g \delta h \quad \text{(Equation 13)}$$

Dividing both sides of Equation 13 by δx for the x direction, and solving for δP yields:

$$\frac{-\delta P}{\delta x} = \rho v \frac{\delta v}{\delta x} + \frac{\mu}{\delta x} \frac{A_\perp}{A} dv_\perp + \frac{A_h}{A} \frac{\rho g \delta h}{\delta x} \quad \text{(Equation 14)}$$

Letting δ get very small approaching a differential yields:

$$\frac{-dP}{dx} = \rho v \frac{dv}{dx} + \frac{\mu}{dx} \frac{A_\perp}{A} \frac{dv}{d_\perp} + \frac{A_h}{A} \frac{\rho g dh}{dx} \quad \text{(Equation 15)}$$

This equation (Equation 15) is used to determine the change in pressure as the element moves in the x direction.

This partial differential equation is then written for the other two principle directions to find state variables in three-space. This form is typically used in CFD, however, other formulations are possible.

Equation 15 may be used to determine the pressure change on a moving element. The energy equation is discussed below. Work, or energy, is force acting over a distance, or force times distance. It takes more work to lift a mass one foot than it does to move it one inch, for example. Thus, Newton's (F=ma) multiplied by the change in distance, or displacement (Δs), yields FΔs=maΔs. Multiplying the forces on a fluid element by displacement yields:

$$ma\Delta s + \mu A_\perp dv_\perp \Delta s + \rho A_h g \delta h \Delta s + \Delta P A \Delta s = 0 \quad \text{(Equation 16)}$$

Considering the equations of motion:

$$v^2 = v_0^2 + 2a\Delta s \quad \text{(Equation 17)}$$

$$\frac{v^2 - v_0^2}{2} = a\Delta s \quad \text{(Equation 18)}$$

and substituting the above term for aΔs yields:

$$m\frac{v^2 - v_0^2}{2} + \mu A_\perp dv_\perp \Delta s + \rho A_h g \delta h \Delta s + \Delta P A \Delta s = 0 \quad \text{(Equation 19)}$$

The first law of thermodynamics states that the change in potential and kinetic energy (pressure energy and energy due to motion) is equal to the heat flux (q) into or out of the system minus any work (W) added or removed from the system. Applying this law to the above yields:

$$m\frac{v^2 - v_0^2}{2} + \mu A_\perp dv_\perp \Delta s + \rho A_h g \delta h \Delta s + \Delta P A \Delta s = q - W \quad \text{(Equation 20)}$$

Since mass equals density times volume, the above equation becomes:

$$\rho V \frac{v^2 - v_0^2}{2} + \mu A_\perp dv_\perp \Delta s + \rho A_h g \delta h \Delta s + \Delta P A \Delta s = q - W \quad \text{(Equation 21)}$$

AΔs equals Volume (V), and dividing both sides of Equation 21 by V becomes:

$$\rho \frac{v^2 - v_0^2}{2} + \mu A_\perp dv_\perp \frac{\Delta s}{V} + \rho A_h g \delta h \frac{\Delta s}{V} + \Delta P = \frac{q - W}{V} \quad \text{(Equation 22)}$$

Since $\Delta s/V = 1/\overline{A}$ (where $\overline{A}$ = average area), dividing both sides of Equation 22 by $\rho$ yields:

$$\frac{v^2 - v_0^2}{2} + dv_\perp \frac{\mu}{\rho} \frac{A_\perp}{\overline{A}} + g\delta h \frac{A_h}{\overline{A}} + \frac{\Delta P}{\rho} = \frac{q - W}{m} \qquad \text{(Equation 23)}$$

Dividing both sides of Equation 23 by g yields:

$$\frac{v^2 - v_0^2}{2g} + dv_\perp \frac{\mu}{\rho g} \frac{A_\perp}{\overline{A}} + \delta h \frac{A_h}{\overline{A}} + \frac{\Delta P}{\rho g} = \frac{q - W}{mg} \qquad \text{(Equation 24)}$$

Since $v^2 - v_0^2 = \delta v^2$:

$$\frac{\delta v^2}{2g} + dv_\perp \frac{\mu}{\rho g} \frac{A_\perp}{\overline{A}} + \delta h \frac{A_h}{\overline{A}} + \frac{\delta P}{\rho g} = \frac{q - W}{mg} \qquad \text{(Equation 25)}$$

Like the momentum equation, other derivations/forms are possible, and CFD uses a partial differential equation form of the energy equation in each principal direction. The new pressure and shear forces are converted back to stresses and shear stresses and the matrix is updated. In this way the model space is calculated in both space and in time. These equations assume that the functions are continuous over space and time and that the Sum of the shear forces around each element is zero. Various numerical schemes are used to accomplish this general process. Results can be viewed graphically or be used to calculate forces such as lift and drag for example.

Other difficulties can occur using this type of model of fluid flow. A model occasionally "diverges," wherein a single node may take off in a positive or negative pressure-velocity trip to infinity. The divergent node would assure conservation of momentum and energy, the pressure and velocity at the node would equal the total energy around it. Ultimately, this divergent node causes division by zero and or approaches infinity, causing calculation problems such as, for example, programs shutting down. Some software using this type model has a feature that generates new meshes based on the results. Most of the time, a new mesh would correct the problem; but sometimes not. Rarely, a mesh would "ring" and not converge to a solution or diverge. Finally, a compressible model has never given physically realistic results when it did not diverge.

This modeling technique has worked very well when the size of the element is made very small, nearly the size of a water or gas molecule. Such a model has been dubbed "Direct Numerical Simulation" (DNS) and requires vast computer resources to solve a model space of a cubic centimeter. Obviously, most problems are on a much larger scale. Various example embodiments of the present general inventive concept allow such calculation and design on such a larger scale.

Descriptions of various embodiments of the present general inventive concept return to the element discussed above, the cube, in the stress field. It is mathematically possible to represent the sum of forces from the six normal stresses acting on the face of the cube with a single force acting at the center of gravity (C.G.) of the cube. Similarly, the moments caused by the six shear stresses can be summed into a single moment acting at the C.G., typically over the radius of gyration for a shape.

FIG. 1 illustrates the forces acting on an arbitrary fluid element. Three principle axes of linear motion are depicted. Around each axis is a rotational velocity $\omega$. The resultant normal force (Fn) and the resultant torque (Ft) from all of the stresses and shear stresses acting on the fluid flow element are shown acting on a raised portion of the surface of the element. Thus, protruding from the fluid element in FIG. 1 is a differential area with a force (Fn) acting perpendicular or normal to the face of the differential area, and a second force (Ft) which acts tangentially to the element. This differential area is shown protruding for illustrative reasons. Ft acts at the C.G., and Fn acts at the radius of gyration, which may or may not be on the surface of the body. These forces (Fn and Ft) represent the resultant of all of the forces acting on the element. For example, if the element were a cube, there would be six forces due to pressure acting on each face. There may be up to six shear forces acting along the face of the cube: Ft is the sum of these moments generated by these shear forces acting over the surfaces. Ft is depicted acting on the face of the differential element, which is a distance from the principle axis creating a torque that may cause rotational acceleration. In a non-symmetric element this distance is called the radius of gyration. Many texts refer to Ft as tau ($\tau$) and when all of the shear forces cancel each other tau is zero. When an element is in a velocity gradient $\tau$ is no longer zero.

These resultant forces and perhaps moments then act on the inertia of the element, causing linear and rotational acceleration. Should this element enter or be in a zone with large velocity gradients then the shear stresses will be out of balance. In these conditions a torque (force acting at a distance ft) is applied to the element. This torque will cause the element to spin and perhaps form a "Vortex", a spinning portion of the flow. Unlike a solid, a fluid exhibits weak shear stress caused by viscosity and this shear stress is velocity gradient dependent. Thus rotational inertia of an arbitrary element is velocity gradient and hence time dependent. As an example of this time dependency, consider how rotating an uncooked egg will cause the liquid next to the shell to rotate. In time, the shear forces within the fluid will "transmit" the inertia at the outer part of the egg towards the middle of the egg. Given enough time, the inertia of the egg will have the inertia of a solid. When the shell of the egg is quickly brought to rest, rotational motion of the fluid within the egg will take time to come to rest and will continue to transmit forces to the shell. Rotational inertia of a fluid is time and thus frequency dependent. This effect is non-trivial in flows with large velocity gradients such as boundary layers, flow jets, hydraulic jumps, and shock waves. These flows generate large shear gradients or Ft and induce rotating flow, a vortex, along with the linear motion of the flow. The following analysis will demonstrate this time dependency.

Figure 2:
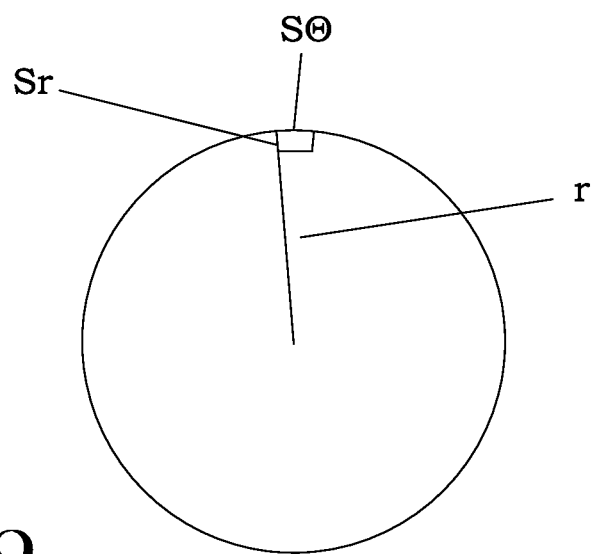
FIG. 2 illustrates a top view of a rotating cylinder of arbitrary radius.

FIG. 2 illustrates a top view of a rotating cylinder of arbitrary radius. FIG. 2 depicts an end view of a cylinder of fluid, and at the 12 o'clock position is located a fluid flow element within the cylinder that is $\delta\theta$ wide, $\delta r$ tall, and extends a depth of $\delta d$. Thus, the cylinder illustrated in FIG. 2 extends "into" the page with a depth ($\delta d$). At the top of the cylinder is the elemental portion of the rotating fluid in the cylinder. Shear forces will act on the surface of an elemental portion of the fluid next to the cylinder. As the cylinder goes from rest to an instantaneously arbitrary rotational velocity, a velocity gradient will occur. Shear force accelerates the fluid element, and the element's motion produces an opposite shear force on the next inner stationary element due to the velocity gradient. These forces (f) are equal to the coefficient of viscosity (ν) times the area perpendicular to the motion of the fluid element ($A_\perp$) times the velocity gradient per unit length.

$$f = \nu A_\perp \delta v / \delta y \quad \text{(Equation 26)}$$

Assigning this fluid element the dimensions: height=$\delta r$, width=$\delta\theta r$, depth=$\delta d$, and setting the viscous force equal to the mass of the element times its acceleration yields:

$$\Sigma f = ma = \nu A_\perp \frac{\delta v}{\delta y} = 0 \quad \text{(Equation 27)}$$

The shear area $A_\perp = \delta d \delta \theta r$. Radial velocity equals $\omega r$ (where $\Omega \equiv v/r$), thus: $\delta v/\delta y = ((\omega r - (\omega r - \omega \delta r))/\delta r$; and mass equals density time volume or $\rho \delta r \delta d \delta \theta r$. Substituting these expressions into Equation 27 yields:

$$\nu \delta d \delta \theta r \frac{[\omega r - (\omega r - \omega \delta r)]}{\delta r} = \rho \delta r \delta d \delta \theta r a \quad \text{(Equation 28)}$$

Simplifying:

$$\nu \omega = \rho a \quad \text{(Equation 29)}$$

From the equations of motion, constant acceleration equals change in velocity over change in time, $a = \delta v/\delta t$ (note: the acceleration varies with velocity so this is the average acceleration.) In determining the time it takes the cylinder to go solid, the change in velocity ($\delta v$) is equal to 0 to car, or simply $\omega r$. The change in time ($\delta t$) is the time it takes (t) to reach that velocity, thus $\delta v/\delta t = \omega r/t$. Substituting the acceleration into the above yields:

$$\nu \omega = \rho \omega r/t \quad \text{(Equation 30)}$$

Since kinematic viscosity≡viscosity divided by density, $\mu = \nu/\rho$. After dividing both sides by $\omega$, making the above substitution and rearranging for t provides:

$$\frac{r}{\mu} = t \quad \text{(Equation 31)}$$

Or, time equals radius divided by kinematic viscosity. This is an approximation. The cylinder containing the fluid cannot undergo an instantaneous acceleration from zero angular velocity to some final velocity. However, this analysis does provide insight into rotational behavior of fluids.

Figure 3:
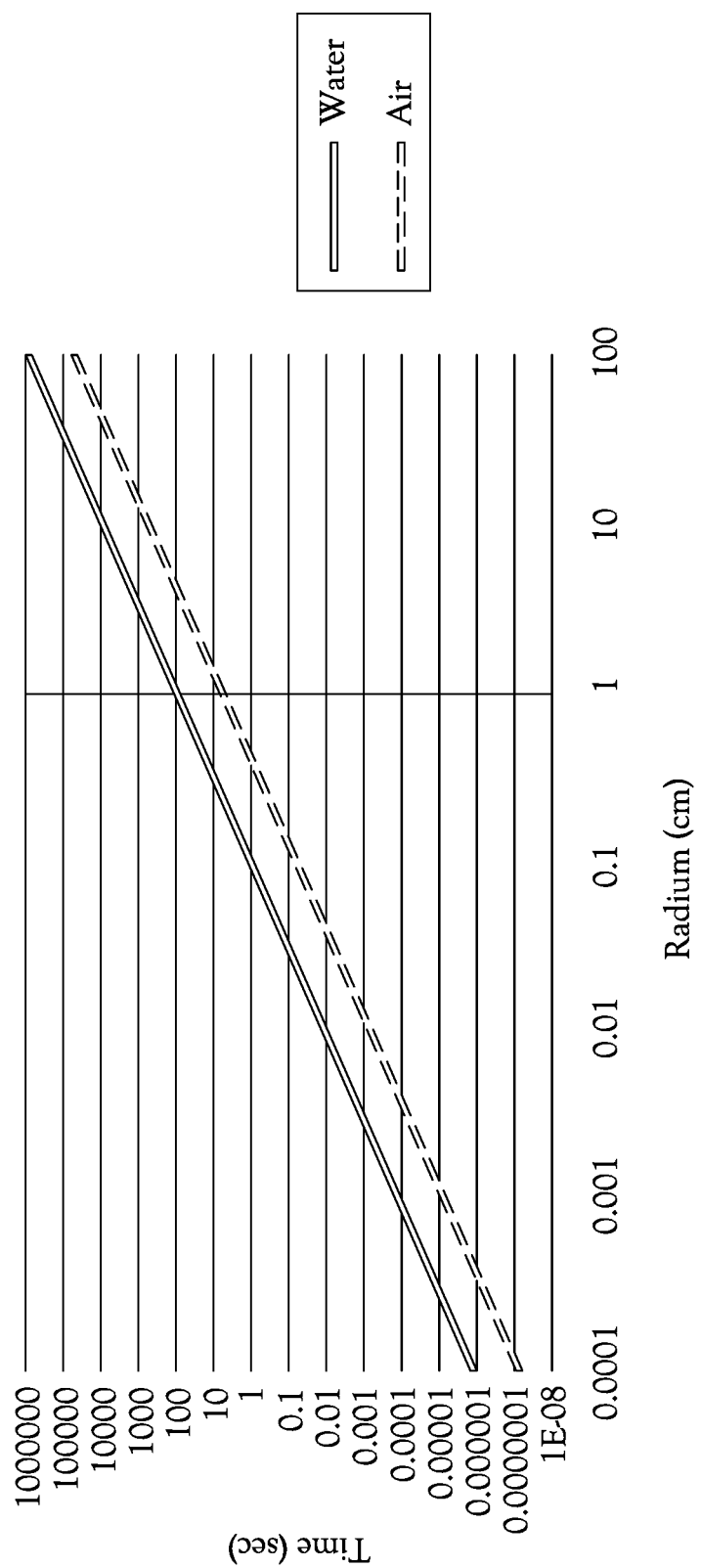
FIG. 3 is a graph illustrating the time it takes for infinitely long cylinders of various radii and viscosities to move from viscous to a solid moment of inertia.

FIG. 3 is a graph illustrating the time it takes for infinitely long cylinders of various radii and viscosities to move from viscous to a solid moment of inertia. The chart depicts the time required for an infinitely long cylinder of air and water to go from rest to a rotating mass without velocity gradients as a function of the radius of the cylinder. For example, a pan of water 10 cm in diameter would take over 300 seconds for the water to achieve the moment of inertia of a solid. If the pan were brought to rest instantaneously, the rotating water would take over 300 seconds to come to rest. The times would actually be somewhat shorter due to friction with the bottom of the pan. Another example is a cup of coffee brought to solid moment of inertia by rapidly stirring with a spoon. When the spoon is slowly raised out of the cup while stirring is continued a rotational solid can be observed as "solid" fluid decaying inertial mass.

Consider the size of an element in a Computational Fluid Dynamics model of a fluid flow. Rotational Inertial Response Time (RIRT) decreases as the element size gets smaller. When the element size becomes very small the RIRT becomes linearly very small. At some point the RIRT is so small that the element is a solid, practically speaking. A very small element can respond nearly immediately to shear forces. Additionally, the moment arm or radius of gyration gets very small so the shear force imbalance becomes much smaller approaching zero. This is why DNS models are so accurate. A model with this very fine resolution and small time scales requires massive computational resources and can only model very small volumes. This is not practical for modeling flow over the surfaces of life size objects and flow fields. Models of the ocean require very large cells. Computational resources will be overwhelmed. As discussed herein, the present general inventive concept provides a modeling method that enhances the amount of information that is gained by the modeling while reducing the resources used by the computer performing the modeling. Various example embodiments of the present general inventive concept also lend themselves readily to parallel processing computers, as models of flow elements may be analyzed in simplified components modeled on electrical analogous flow resistors and resistor arrays which are easily shared by such resources.

Figure 4:
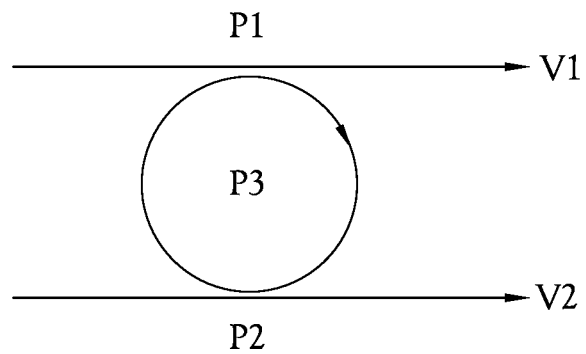
FIG. 4 illustrates a rotating portion of a flow field between a high speed flow and a lower speed flow.

FIG. 4 illustrates a rotating portion of a flow field between a high speed flow and a lower speed flow, in order to consider how the rotating portion of the flow field will behave in a simple model. FIG. 4 shows an upper portion of a flow moving at V1, and a lower portion of flow moving at V2, where V1 is greater than V2. In between these two zones of flow is a third zone which is rotating and may or may not be moving to the right. Thus, high speed flow V1 moves over the lower speed portion moving at V2, and in between these two parts of the flow, a third zone forms where the flow is undergoing a rotational motion, superimposed on linear motion in the same direction as the other zones. All three zones, the two linear portions and the vortex, have the same static pressure, so the pressure P1, P2, and P3 are the pressure depression due to motion, the dynamic head, which is defined by Bernoulli's equation. Since the total energy (sum of kinetic and potential, or pressure, energy) is a constant for all of the flow zones (heat and work are not being added or removed) and if frictional heating is ignored, it is possible to calculate the unknown pressures and velocities. Understanding the relationship between rotational motion and pressure forces is required to do this.

Figure 5:
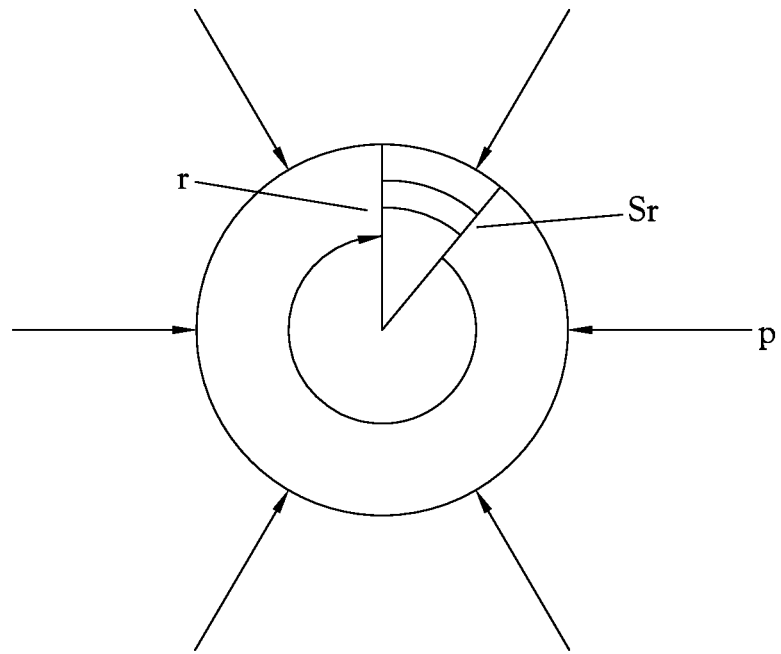
FIG. 5 illustrates a relationship between rotational motion and pressure forces acting on the rotational motion.

FIG. 5 illustrates a relationship between rotational motion and pressure forces acting on the rotational motion. FIG. 5 illustrates a cylinder of fluid rotating in a clockwise direction at a rate of rotation co. Within the pie slice portion of the cylinder is a fluid flow element that is $\delta r$ thick that extends to a depth $\delta d$. The inward pointing arrows represent pressure acting on the surface of the cylindrical rotating fluid. Thus, pressure forces (the external inward pointing arrows) act on the perimeter of a rotating portion of a flow. Opposing the pressure force is the force required to contain the outward acceleration or centrifugal force (note: Centripetal is Latin for towards the center, and Centrifugal is Latin for traveling away from center) of the rotating flow. Outward acceleration is $\omega^2 r$ time the mass of the vortex. Inward pressure forces equal and oppose the outward rotational acceleration when balance is achieved. Thus:

$$PA = \frac{m\omega^2 r}{g} \quad \text{(Equation 32)}$$

Assigning a depth of "d" to FIG. 5 and computing the mass of fluid using density in the vortex by performing the following integral along with an expression of the outer area yields:

$$P\pi 2rd = \left(\rho d \int_0^r 2\pi r\, dr\right)\frac{\omega^2 r}{g} \quad \text{(Equation 33)}$$

Simplifying Equation 33 yields:

$$P = \frac{\rho\omega^2}{g}\int_0^r r\, dr = \frac{\rho\omega^2}{g}\frac{r^2}{2} + c \quad \text{(Equation 34)}$$

The "c" in Equation 34 is the pressure at the center or r=0. With a relationship between pressure, rotational/radial velocity (omega=Vr/r), and radius it is possible to explore what happens at the steady state velocity interface. Writing the Bernoulli form of the energy equation:

$$\frac{V_1^2}{2g} + \frac{P_1}{\rho} = \frac{V_2^2}{2g} + \frac{P_2}{\rho} = \frac{V_3^2}{2g} + \frac{P_3}{\rho} + \rho\omega^2\frac{r^2}{2g} \quad \text{(Equation 35)}$$

Since $P_3$ is equal to:

$$P_1 - P_2 = P_3 \quad \text{(Equation 36)}$$

Gathering the velocity and pressure terms together yields:

$$\frac{V_1^2}{2g} - \frac{V_2^2}{2g} + \frac{P_1}{\rho} - \frac{P_2}{\rho} - \frac{P_3}{\rho} = \frac{V_3^2}{2g} + \rho\omega^2\frac{r^2}{2g\rho} \quad \text{(Equation 37)}$$

Substituting for $P_3$ for $P_1-P_2$ yields:

$$\frac{V_2^2}{2g} - \frac{V_1^2}{2g} = \frac{V_3^2}{2g} + \frac{\omega^2 r^2}{2g} \quad \text{(Equation 38)}$$

Multiplying both sides of Equation 38 by 2 g yields:

$$V_2^2 - V_1^2 = V_3^2 + \omega^2 r^2 \quad \text{(Equation 39)}$$

Assigning values to $V_1$, $V_2$, and $V_3$ still leaves two unknown variables ω and r. Let us assume that the radial velocity (ωr) of the spinning fluid is one half of the velocity difference $V_1-V_2$ divided by two. This assumption is based on the fact that the dynamic pressure forces at the top and bottom of the rotating fluid are equal and opposite, and thus in equilibrium. Further, for simplicity, it is assumed that $V_3$, the vortex's linear velocity, is zero. Thus: $V_3=0$, ωr=$(V_2-V_1)/2$, $V_1=2$, $V_2=1$.

Thus:

$$\omega r = \frac{V_2 - V_1}{2} = \frac{1-2}{2} = -.5 \quad \text{(Equation 40)}$$

and:

$$r = \frac{-.5}{\omega} \quad \text{(Equation 41)}$$

Substituting the above into the equation for ωr yields:

$$1^2 - 2^2 = \omega^2 \frac{-.5^2}{\omega} \quad \text{(Equation 42)}$$

Solving for ω:

$$\omega = \frac{V_2^2 - V_1^2}{\left(\frac{V_2 - V_1}{2}\right)^2} = \frac{1^2 - 2^2}{-.5^2} = \frac{1-4}{.25} \quad \text{(Equation 43)}$$

$$\omega = -12$$

Solving Equation 43 for the variables shown above arrives at the value −12 for ω. With ω thus solved, r is:

$$r = \frac{-.5}{\omega} = \frac{-.5}{-12} = 0.04167 \quad \text{(Equation 44)}$$

Figure 6:
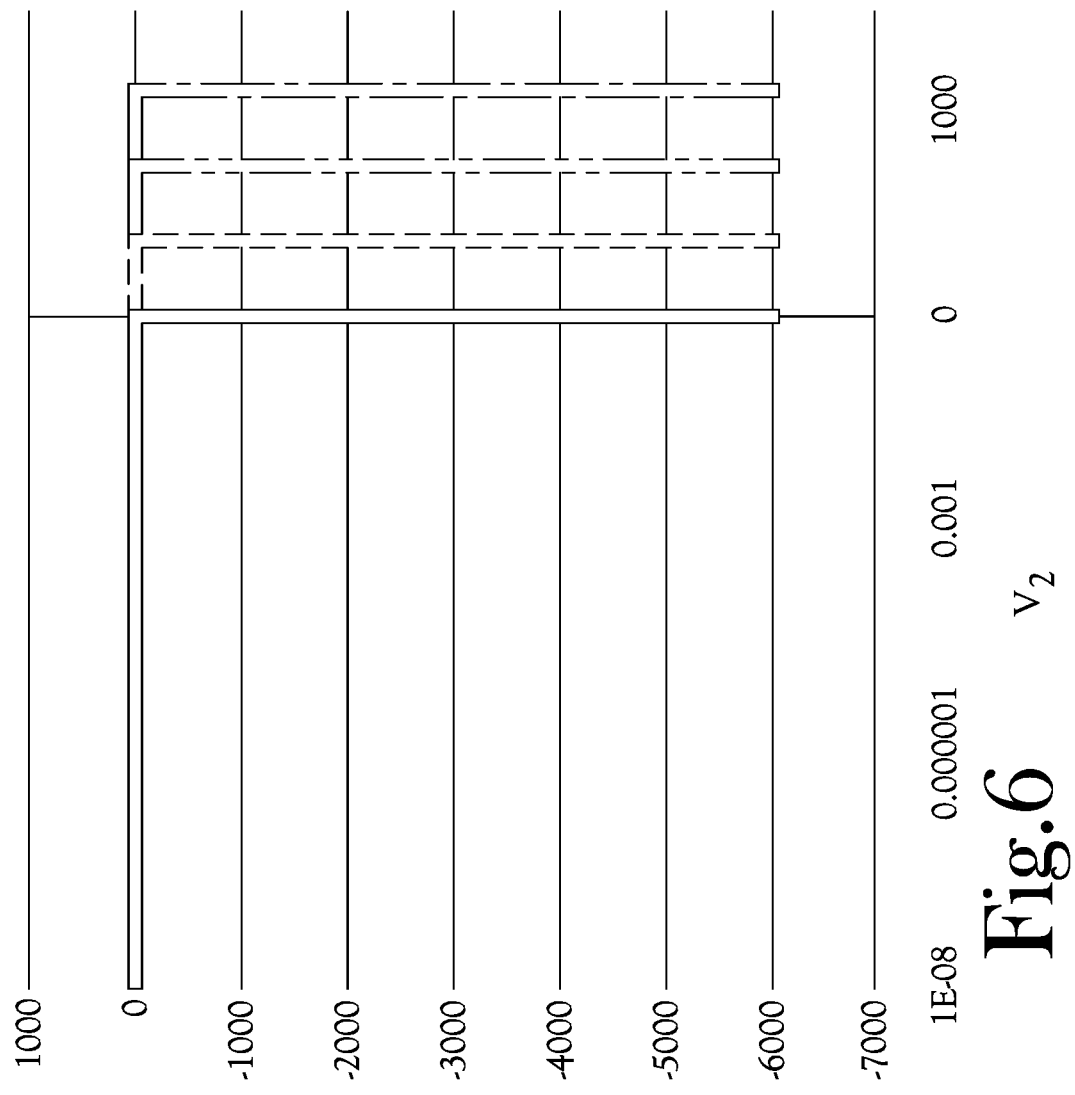
FIGS. 6-7 are charts respectively illustrating rotational velocity and radius of an element between fields with different flow speeds.
Figure 7:
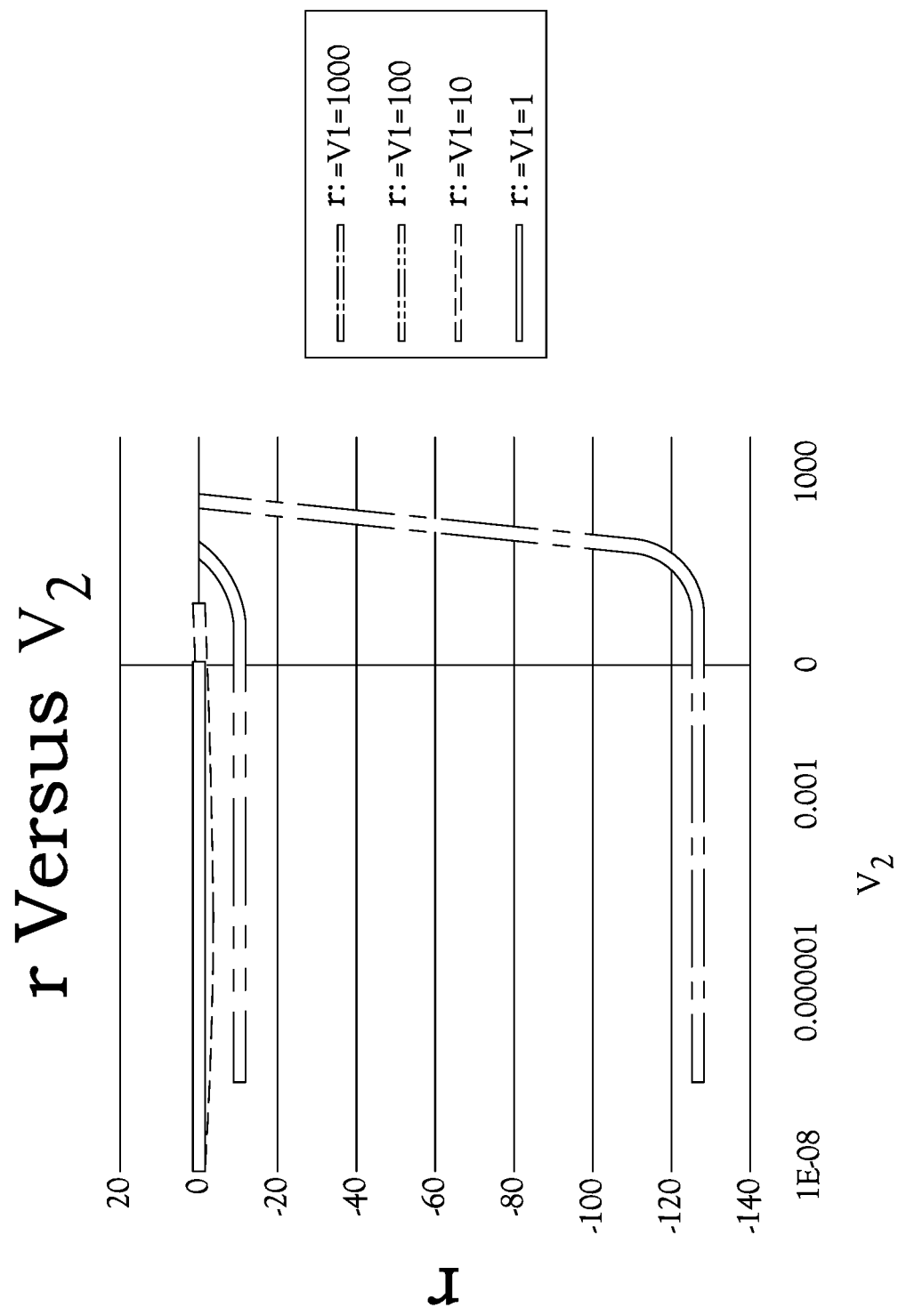

FIGS. 6-7 are charts respectively illustrating rotational velocity and radius of an element between fields with different flow speeds. FIGS. 6-7 respectively illustrate omega (ω) and r when V1 is 1, 10, 100 and 1000 and where V2 varies from 0 to each value of V1. Thus, FIG. 6 depicts the rate of rotation (the abscissa) of a cylindrical fluid element for four values of the flow V1 illustrated in FIG. 4 as V2 of FIG. 4 varies from zero to V1 (the ordinate), assuming the rotating portion of the flow has no motion to the right in FIG. 4. Similarly, FIG. 7 depicts the radius of a rotating cylinder (abscissa) for the four same values of V1 shown in FIG. 6 as V2 varies from zero to V1 (the ordinate), assuming the rotating portion of the flow has no motion to the right in FIG. 4. At equilibrium ω varies from 4 to 6076 as the velocity gradient decreases, and r varies from r=V1 times 0.125 to zero as the velocity gradient decreases. High velocity flows have the potential to develop quite large vortexes. At a boundary, a flow field develops many small rotating layers and, as the flow moves further along, the balance will be lost when the flow field changes due to momentum/pressure loss, known as diffusion, to other portions of the flow field, momentum loss to frictional losses, etc. At some point the balance will be broken and the rotating momentum will become linear momentum at the point where the balance loss occurs. This will accelerate the surrounding flow in the direction perpendicular to where the imbalance occurs. A second vortex could form or perhaps curvilinear motion. Clearly this process would appear to be chaotic.

Conditions may develop in the flow field where the shape of the element is not round, tubular, or spaghetti like. A vortex could become elliptical for example. Still the force balance around the perimeter must be maintained. The vortex will shape itself to conform to lines of pressure called stream lines.

Invariably, as the radius of the vortex grows and flow conditions change, chaotic appearing flow may ensue. Considering this and the time dependent inertia of a vortex, modeling this rotational movement with a simple equation or two would be inadequate for problems with great velocity gradients. Also, the vortex in a flow field acts like an inductor, and the preceding discussions have considered a filled, or "solid", or fully charged, inductor. In practice the vortexes in a flow field will start off small and as more rotational inertial is added the element will get larger until the pressure balance described above occurs, at which point momentum will no longer be exchanged. Thus rotational portions of the flow will always be "solid". Another important modeling consideration is that once rotation and the balance are formed, mass does not move into or out of the vortex unless additional torque acts on the element or the pressure balance is broken.

Vortexes in a flow field can only occur when there is a velocity gradient. This gradient can be caused by linear or spinning motion. Over time this rotational momentum will be converted into linear momentum. The element will tend to lose its rotation and convert it to linear motion that ultimately moves along at the speed of the surrounding flow. Spin tends to die out as a flow moves out of the velocity gradient. One can imagine that once these rotating portions of the flow begin to interact, large variations in flow conditions may develop chaos/turbulence. The following example will give some insight into how to model spin and its importance in modeling a real flow field mathematically.

A simplified example is a basketball thrown by an athlete at a pitcher's mound. Suppose the basketball is thrown in a way that all of the athlete's force acts through the center of gravity of the basketball in the direction of the balls flight path. The ball will be traveling towards the mound with no spin. It will have only linear velocity. Gravity will act on the ball as it travels toward the mound and the trajectory will become curvilinear. The ball will have motion in two dimensions, horizontal and vertical, and the cross product of a matrix describing this motion is the ball's vorticity (rate of curvature) during the flight to the mound. The terminology is confusing here: vorticity is rotation brought about by curving motion and is not the same as the rotation of a vortex (a). Interestingly, a vortex can also have vorticity if its path is curvilinear.

At impact with the mound the ball will be subjected to an impulse with the mound. Since the mound is immovable all of the momentum the ball had before the impact will be used to compress the ball. If the direction of the ball, center of gravity of the ball and the impact point on the ball all line up with the mound, all of the momentum will compress the ball. Assume that all of the momentum is used to compress the ball and that the compression and expansion of the ball is loss free. Then the ball will bounce back in the direction of travel just before the ball hit the mound without any spin at the same but at the opposite speed it struck the mound.

If the line of travel, passing through the center of gravity of the basketball, is offset from the point of impact with the mound than the impulse produces both a force and a force acting at a distance from the ball's center of gravity, a moment. As the offset increases, the ball will spin faster and lose more linear velocity to rotational velocity. Finally, at a large offset, the ball will strike the mound and slide so momentum will be lost to this friction.

Suppose our talented athlete throws the ball perfectly—no rotation, so the ball strikes the pitcher's mound, bounces up and lands on the back side of the mound directly opposite where it struck the front side. The first impact will slow the ball; give it rotation and upward momentum. As the ball passes over the mound gravity will reverse the upward motion and bring it to the impact point on the back side. The second impact happens on the opposite side of the center of gravity of the ball so the moment is opposite the rotation of the ball. All of the rotating momentum is converted into linear motion. After the second impact the ball moves without spin and gains linear momentum. Momentum can move in and out of rotating and linear states.

The simplest mathematical model of the basketball trajectory is a two dimensional one that contains the distance from the athlete and the height of the ball, or X and Y. To model the spin of the basketball we will need a third dimension-angle. For this simple model we know that the axis of rotation is always perpendicular to the X-Y plane. We can model the position of the basketball over time with a function containing $(t, X, Y, \theta)$ at any point along the ball's flight path. This model can be extended to describe the position of a basketball during a basketball game and the function required to record its position at each point in time would have the following variables: t, X, Y, Z, $\theta$, i, j, and k. X, Y, Z are the position of the center of gravity of the basketball, $\theta$ is the angular position and i, j, k are a unit vector originating at the center of the basketball around which $\theta$ occurs that identifies the axis of the angle of rotation. Also, the basketball is a solid and can rotate along one axis at any point in time. However, this axis can move. $\theta$, i, j, k, which describes the rotational position of the basketball, are called a "Quaternion." Having a four dimension parameter for a three dimensional variable may be valuable, besides mathematical gimble lock, for some of the following reasons discussed regarding unit quarternion notation: "There are at least eight methods used fairly commonly to represent rotation, including: (i) orthonormal matrices, (ii) axis and angle, (iii) Euler angles, (iv) Gibbs vector, (v) Pauli spin matrices, (vi) Cayley-Klein parameters, (vii) Euler or Rodrigues parameters, and (viii) Hamilton's quaternions. One advantage of the unit quaternion representations is that it leads to a clear idea of what the "space of rotations" is—we can think of it as the unit sphere $S_3$ in 4-space with antipodal points identified ($-°q$ represents the same rotation as $°q$). (Equivalently it is the projective space $P_3$). This makes it possible, for example, to compute averages over all possible attitudes of an object. It also makes it possible to sample the space of rotations in a systematic way—or randomly—with uniform sampling density. Another advantage is that, while redundant (4 numbers to represent 3 degrees of freedom), the extra constraint (namely that it has to be a unit quaternion) is relatively easy to deal with. This makes it possible to find closed-form solutions to some optimization problems involving rotations. Such problems are hard to solve when using orthonormal matrices to represent rotation because of the six non-linear constraints to enforce orthonormality (RTR=I), and the additional constraint det(R)=+1. If we compose rotations using multiplication of 3×3 matrices, numerical problems will conspire to make the results not quite orthonormal. It is difficult to find the "nearest" orthonormal matrix to one that is not quite orthonormal. While multiplying unit quaternions may similarly lead to quaternions that are no longer of unit length, these are easy to normalize. When it comes to rotating vectors and composing rotations, quaternions may have less of an advantage. While it takes fewer operations to multiply two unit quaternions than it does to multiply two orthonormal matrices, it takes a few more operations to rotate a vector using unit quaternions (although the details depend in both cases on how cleverly the operation is implemented!)." ("Some Notes on Unit Quaternions and Rotation," Berthold K. P. Horn, Copyright © 2001 via the WWW.)

With a method for defining the position of an element in three-space, angular position, and time, all that remains is to calculate the next positon in the next time interval. Returning to the element force balance and recalling that a moment is force acting at a distance (torque), it follows that the sum of the torques will also equal zero. This is taken from the principle that for every force there is an equal and opposite force, thus the sum is zero. Putting it all together, the sum of the forces and moments equals zero: ΣF+Σt=0=mass×acceleration+pressure+viscous+gravitational+torque+rotational inertia.

Or, mathematically:

$$0 = ma + P_1A_1 + P_2A_2 + \mu A_\perp dv_\perp + \rho A_h g\delta h + Fr + I\alpha \quad \text{(Equation 45)}$$

In Equation 45, I=Rotational Inertia=mass times radius squared=$mr^2$, and α=rotational acceleration=change in angle (Δθ) divided by time squared=$\Delta\theta/t^2$, which also equals rotational velocity (change in angle per unit time)≡(ω) divided by time ω/t=$\Delta\theta/t^2$.

Turning to the conservation of momentum, it is shown above that force times time equals change in momentum, so torque times time equals change in rotational momentum. Multiplying the equation for the sum of the forces and torques by the change in time yields:

$$0 = ma\delta t + P_1 A_1 \delta t + P_2 A_2 \delta t + \mu A_\perp dv_\perp \delta t + \rho A_h g \delta h \delta t + Fr\delta t + I\alpha \delta t \quad \text{(Equation 46)}$$

Since maδt=mδv and Iαδt=Iδω, Equation 46 can be written as:

$$0 = m\delta v + P_1 A_1 \delta t + P_2 A_2 \delta t + \mu A_\perp dv_\perp \delta t + \rho A_h g \delta h \delta t + Fr\delta t + I\delta\omega \quad \text{(Equation 47)}$$

Dividing both sides of Equation 47 by δt yields:

$$0 = \frac{m\delta v}{\delta t} + P_1 A_1 + P_2 A_2 + \mu A_\perp dv_\perp + \rho A_h g\delta h + Fr + \frac{I\delta\omega}{\delta t} \quad \text{(Equation 48)}$$

Since m/δt is mass flow rate, and $I=mr^2$, Equation 48 may be expressed as:

$$0 = \dot{m}\delta v + P_1 A_1 + P_2 A_2 + \mu A_\perp dv_\perp + \rho A_h g\delta h + Fr + mr^2 \frac{I\delta\omega}{\delta t} \quad \text{(Equation 49)}$$

Using a control volume notation, the Equation 49 becomes:

$$\dot{m}v_i - \dot{m}v_o = P_1A_1 + P_2A_2 + \mu A_\perp dv_\perp + \rho A_h g\delta h + Fr + \dot{m}r^2\sigma\omega \quad \text{(Equation 50)}$$

The energy equation that conserves energy from both forces and torques is similarly derived. Energy is force acting over a distance, so multiplying the Force and Torques by displacement will produce the energy conservation equation:

$$0 = ma\delta s + P_1A_1\delta s + P_2A_2\delta s + \mu A_\perp dv_\perp \delta s + \rho A_h g\delta h\delta s + Fr\Delta\theta + I\alpha\Delta\theta \quad \text{(Equation 51)}$$

Note that the derivation of the Conservation of Energy equation above assumed the area of the element was constant. The development below is more general and does not assume a symmetric element. From the equations of motion:

$$v^2 = v_0^2 + 2a\Delta s \quad \text{(Equation 52)}$$

$$\frac{v^2 - v_0^2}{2} = a\Delta s \quad \text{(Equation 53)}$$

For Angular Motion, the equations are as follows:

$$\omega^2 = \omega_0^2 + 2a\Delta\theta \quad \text{(Equation 54)}$$

$$\frac{\omega^2 - \omega_0^2}{2} = a\Delta\theta \quad \text{(Equation 55)}$$

Substituting these equations of angular motion into the energy equation yields:

$$0 = m\frac{v^2 - v_0^2}{2} + P_1A_1\delta s + P_2A_2\delta s + \mu A_\perp dv_\perp \delta s + \rho A_h g\delta h\delta s + Fr\delta\theta + I\frac{\omega^2 - \omega_0^2}{2} \quad \text{(Equation 56)}$$

Appling the First Law of Thermodynamics to Equation 56 yields:

$$q - W = m\frac{v^2 - v_0^2}{2} + P_1A_1\delta s + P_2A_2\delta s + \mu A_\perp dv_\perp \delta s + \rho A_h g\delta h\delta s + Fr\delta\theta + I\frac{\omega^2 - \omega_0^2}{2} \quad \text{(Equation 57)}$$

Since $I=mr^2$ and $m=\rho V$, Equation 57 can be written as:

$$q - W = \rho V\frac{v^2 - v_0^2}{2} + P_1A_1\delta s + P_2A_2\delta s + \mu A_\perp dv_\perp \delta s + \rho A_h g\delta h\delta s + Fr\delta\theta + \rho V r^2\frac{\omega^2 - \omega_0^2}{2} \quad \text{(Equation 58)}$$

Considering AΔs equals Volume (V), and dividing both sides of Equation 58 by V yields:

$$\frac{q - W}{V} = \rho\frac{v^2 - v_0^2}{2} + P_1A_1\frac{\delta s}{V} + P_2A_2\frac{\delta s}{V} + \mu A_\perp dv_\perp \frac{\delta s}{V} + \rho A_h g\delta h\frac{\delta s}{V} + Fr\frac{\delta\theta}{V} + \rho r^2\frac{\omega^2 - \omega_0^2}{2} \quad \text{(Equation 59)}$$

Since δs/V=1/$\bar{A}$, and dividing both sides of Equation 59 by ρ yields:

$$\frac{q - W}{m} = \frac{v^2 - v_0^2}{2} + P_1\frac{A_1}{\rho \bar{A}} + P_2\frac{A_2}{\rho \bar{A}} + \mu dv_\perp \frac{A_\perp}{\rho \bar{A}} + \rho A_h g\delta h\frac{1}{\rho \bar{A}} + Fr\frac{1}{\rho \bar{A}} + r^2\frac{\omega^2 - \omega_0^2}{2} \quad \text{(Equation 60)}$$

Dividing both sides of Equation 60 by g yields:

$$\frac{q - W}{mg} = \frac{v^2 - v_0^2}{2g} + P_1\frac{A_1}{\rho g\bar{A}} + P_2\frac{A_2}{\rho g\bar{A}} + \quad \text{(Equation 61)}$$

-continued $$\mu dv_\perp \frac{A_\perp}{\rho g \overline{A}} + \rho A_h \delta h \frac{1}{\rho g \overline{A}} + Fr \frac{1}{\rho g \overline{A}} + r^2 \frac{\omega^2 - \omega_0^2}{2g}$$

Again, the above energy conservation equation can be written in a differential form or other forms for model implementation. To address the divergence problem and provide a way for an element to change size as rotational momentum moves in and out over time an additional equation is required. So far, force acting for a time period and force acting over a distance have been considered; the next logical step is to consider force acting as a function of both distance and time. How long and how far a force is applied is power, or the time rate of work. Force times velocity is power, which leads to:

$$0 = ma\breve{v} + P_1 A_1 \breve{v} + P_2 A_2 \breve{v} + \mu A_\perp dv_\perp \breve{v} + \rho A_h g \delta h \breve{v} + Fr\overline{\omega} + I\alpha\overline{\omega} \quad \text{(Equation 62)}$$

In Equation 62, $\breve{v}$ and $\overline{\omega}$ are defined as the average velocity and rate of rotation over the time period ($\Delta s/\Delta t$, $\Delta\omega/\Delta t$). The first law of thermodynamics, divided by time, is the time rate of work or power. Thus:

$$\frac{q - W}{\Delta t} = ma\breve{v} + P_1 A_1 \breve{v} + P_2 A_2 \breve{v} + \quad \text{[Equation 63]}$$
$$\mu A_\perp dv_\perp \breve{v} + \rho A_h g \delta h \breve{v} + Fr\overline{\omega} + I\alpha\overline{\omega}$$

Since $\breve{v} = \Delta s/\Delta t$, and using the equations of motion:

$$v^2 = v_0^2 + 2a\Delta s \quad \text{[Equation 64]}$$

$$\frac{v^2 - v_0^2}{2} = a\Delta s \quad \text{[Equation 65]}$$

$$\frac{a\Delta s}{\Delta t} = av = \frac{v^2 - v_0^2}{2\Delta t} \quad \text{[Equation 66]}$$

$$\omega^2 = \omega_0^2 + 2\alpha\theta \quad \text{[Equation 67]}$$

$$\frac{\omega^2 - \omega_0^2}{2} = \alpha\theta \quad \text{[Equation 68]}$$

$$\frac{\alpha\Delta\theta}{\Delta t} = \alpha\omega = \frac{\omega^2 - \omega_0^2}{2\Delta t} \quad \text{[Equation 69]}$$

Substituting $I=mr^2$ and the rotational acceleration terms from above yields:

$$\frac{q - W}{\Delta t} = m\frac{v^2 - v_0^2}{2\Delta t} + P_1 A_1 \breve{v} + P_2 A_2 \breve{v} + \quad \text{[Equation 70]}$$
$$\mu A_\perp dv_\perp \breve{v} + \rho A_h g \delta h \breve{v} + Fr\overline{\omega} + mr^2 \frac{\omega^2 - \omega_0^2}{2\Delta t}$$

Av, or area times velocity, is volumetric flow (Q). Substituting Q for Av in the pressure term and dividing both sides by Q yields:

$$\frac{q - W}{\Delta t Q} = m\frac{v^2 - v_0^2}{2\Delta t Q} + P_1 \frac{Q_1}{Q} + P_2 \frac{Q_2}{Q} + \quad \text{[Equation 71]}$$
$$\mu A_\perp dv_\perp \frac{\breve{v}}{Q} + \rho A_h g \delta h \frac{\breve{v}}{Q} + Fr \frac{\overline{\omega}}{Q} + mr^2 \frac{\omega^2 - \omega_0^2}{2\Delta t Q}$$

Since $\overline{Q} \Delta t$=Volume, and $v/\overline{Q}=1/\overline{A}$, Equation 71 can be written as:

$$\frac{q - W}{V} = m\frac{v^2 - v_0^2}{2V} + P_1 \frac{Q_1}{\overline{Q}} + P_2 \frac{Q_2}{\overline{Q}} + \quad \text{[Equation 72]}$$
$$\mu A_\perp dv_\perp \frac{1}{\overline{A}} + \rho A_h g \delta h \frac{1}{\overline{A}} + Fr \frac{\overline{\omega}}{\overline{Q}} + mr^2 \frac{\omega^2 - \omega_0^2}{2V}$$

Because the mass flow rate is a constant within the element, $Q_1$ and $Q_2$ equal $\overline{Q}$, which yields:

$$\frac{q - W}{V} = m\frac{v^2 - v_0^2}{2V} + P_1 + P_2 + \quad \text{[Equation 73]}$$
$$\mu A_\perp dv_\perp \frac{1}{\overline{A}} + \rho A_h g \delta h \frac{1}{\overline{A}} + Fr \frac{\overline{\omega}}{\overline{Q}} + mr^2 \frac{\omega^2 - \omega_0^2}{2V}$$

Rearranging and dividing both sides of Equation 73 by $\overline{Q}$ yields:

$$\frac{-P_1 - P_2}{\overline{Q}} = -\frac{q - W}{V\overline{Q}} + m\frac{v^2 - v_0^2}{2V\overline{Q}} + \quad \text{[Equation 74]}$$
$$\mu A_\perp dv_\perp \frac{1}{\overline{A}\overline{Q}} + \rho A_h g \delta h \frac{1}{\overline{A}\overline{Q}} + Fr \frac{\omega}{\overline{Q}^2} + mr^2 \frac{\omega^2 - \omega_0^2}{2V\overline{Q}}$$

Since $P_2$ acts in the opposite direction of $P_1$, as does the torque and rotational inertia, and $2V\overline{Q}=2V\overline{A}\breve{v}$, Equation 74 can be written as:

$$\frac{\Delta P}{\overline{Q}} = \frac{q - W}{V\overline{Q}} - m\frac{v^2 - v_0^2}{2V\overline{A}\breve{v}} - \quad \text{[Equation 75]}$$
$$\frac{\mu A_\perp dv_\perp}{\overline{A}\overline{Q}} - \frac{\rho A_h g \delta h}{\overline{A}\overline{Q}} + Fr \frac{\omega}{\overline{Q}^2} - mr^2 \frac{\omega^2 - \omega_0^2}{2V\overline{Q}}$$

Since: the following expression is true:

$$\frac{v^2 - v_0^2}{\breve{v}} = \frac{v^2 - v_0^2}{\frac{v + v_0}{2}} = \frac{2(v - v_0)(v + v_0)}{v + v_0} = 2(v - v_0) = 2\delta v \quad \text{[Equation 76]}$$

And since $\overline{Q} = \overline{A}\breve{v}$, Equation 75 can be written as:

$$\frac{\Delta P}{\overline{Q}} = \frac{q - W}{V\overline{Q}} - m\frac{\delta v}{V\overline{A}} - \quad \text{[Equation 77]}$$
$$\frac{\mu A_\perp dv_\perp}{\overline{A}\overline{Q}} - \frac{\rho A_h g \delta h}{\overline{A}\overline{Q}} + Fr \frac{\omega}{\overline{Q}^2} - mr^2 \frac{\omega^2 - \omega_0^2}{2V\overline{Q}}$$

Since density ($\rho$)=mass divided by volume, Equation 77 can be written as:

$$\frac{\Delta P}{\overline{Q}} = \frac{q - W}{V\overline{Q}} - \rho\frac{\delta v}{\overline{A}} - \frac{\mu A_\perp dv_\perp}{\overline{A}\overline{Q}} - \quad \text{[Equation 78]}$$

-continued $$\frac{\rho A_h g \delta h}{\overline{A Q}} + Fr\frac{\omega}{\overline{Q}^2} - \rho r^2 \frac{\omega^2 - \omega_0^2}{2\overline{Q}}$$

$\Delta P/\overline{Q}$ is the resistance of the flow element and it is analogous to an electrical resistor, except that the resistance changes with $\overline{Q}$ and in time (due to rotation). These resistances can be summed across the model space to find the overall pressure drop, or overall resistance, for a given flow at a point in time for example. Since this resistance varies linearly along each direction, it can be readily added or broken into smaller pieces that sum to the overall resistance. When a flow element is in an area of the model with a velocity gradient, rotation will ensue. The vortex will be fairly small initially, and as it continues to receive rotational momentum its size must increase to maintain the centrifugal pressure balance discussed above. Linear elements on either side of the expanding vortex can be added to the large ones surrounding the vortex as it grows. In this way elements can grow and shrink over time and space as the model runs. A model that is self-meshing will result. Such a model can be averaged over time, and the average resistance of the model may be calculated, for example.

Areas with little to no turbulence can be represented in the model accurately with vary large elements. When turbulence increases, such as when the flow nears the surface of an object, small elements can be easily added and the overall resistance can be calculated. Conversely, as the vortex loses rotational momentum to the conversion of linear-curvilinear momentum these elements can be combined into larger ones. In this way element/resistor size and number can be added and subtracted in time as "flow" transverses a model. This model will be self-meshing in time based on the physics and flow conditions.

A CFD model in an eight-dimension space using the four conservation equations with the rotational torque momentum balance adds two more variables to the traditional modeling technique: angle (θ) and radius (r). It also adds two more equations, the power equation and the Bernoulli Pressure balance. The new equations allow the new variables to be calculated. Various example embodiments of the present general inventive concept may include various implementation techniques to control how the model adapts element size to rotation momentum content and other modeling considerations, such as numerical stability, as well as others.

The equation for flow resistance can be solved for r, the radius of gyration of the vortex:

$$\frac{\Delta P}{\overline{Q}} = \frac{q - W}{V\overline{Q}} - \rho \frac{\delta v}{\overline{A}} - \frac{\mu A_\perp dv_\perp}{\overline{A Q}} -$$ [Equation 79]

$$\frac{\rho A_h g \delta h}{\overline{A Q}} + Fr\frac{\omega}{\overline{Q}^2} - \rho r^2 \frac{\omega^2 - \omega_0^2}{2\overline{Q}}$$

This is a quadratic equation ($ax^2+bx=c$) in which the solution is:

$$x = \frac{-b \pm \sqrt{b^2 - 4ac}}{2a} \text{ in } r,$$

or:

$$r = \frac{-b \pm \sqrt{b^2 - 4ac}}{2a}$$ (Equation 80)

In Equation 80, a, b, and c equal:

$$a = \rho \frac{\omega^2 - \omega_0^2}{2\overline{Q}}$$ (Equation 81)

$$b = F\frac{\omega}{\overline{Q}^2}$$ (Equation 82)

$$c = \frac{\Delta P}{\overline{Q}} - \frac{q - W}{V\overline{Q}} + \rho\frac{\delta v}{\overline{A}} + \frac{\mu A_\perp dv_\perp}{\overline{A Q}} + \frac{\rho A_h g \delta h}{\overline{A Q}}$$ (Equation 83)

This equation for radius has a resistance term $$\left(\frac{\Delta P}{\overline{Q}}\right)$$

in "c". This resistance $$\frac{\Delta P}{\overline{Q}}$$

is the resistance of a control volume bounding the vortex. This control volume contains both the vortex of fluid and the fluid that is directly affected by the presence of the vortex. Since the vortex is moving slower than the flow around it, the rotating body of flow is exposed to both pressure drag and viscous forces due to this rotating element's movement. In a sense, it is like a "solid" body in the flow field and consequently it influences a portion of the flow. The size of the flow which is directly changed by the vortex is the "control volume" for determining the forces on the vortex. Further, since no energy or power is being added to the control volume, the resistance of the control volume is directly related to the resistance caused by the vortex in the flow stream. In various example embodiments of the present general inventive concept, the following analysis may determine the size of the control volume.

Figure 8:
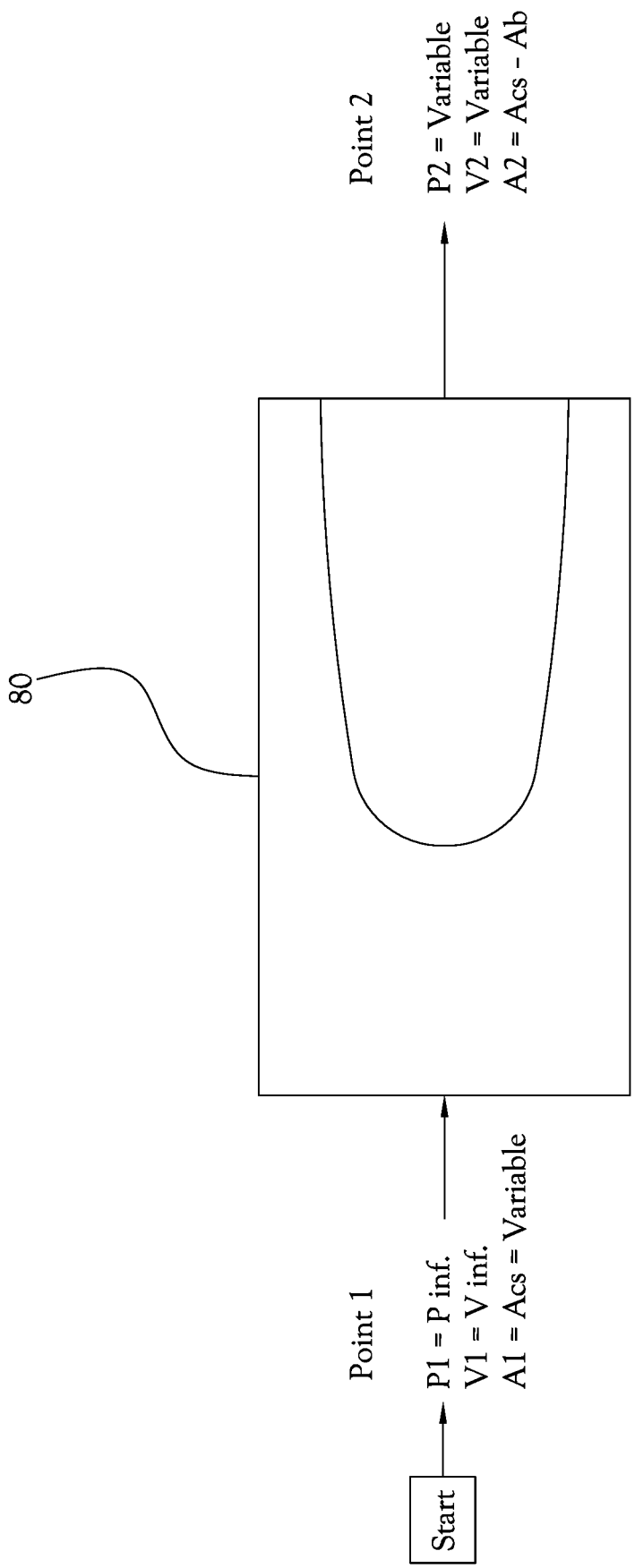
FIG. 8 illustrates a vortex in a flow field and identifies various points and variables for a control volume calculation according to an example embodiment of the present general inventive concept.

FIG. 8 illustrates a vortex in a flow field and identifies various points and variables for a control volume calculation according to an example embodiment of the present general inventive concept. FIG. 8 illustrates the flow direction as being from Point 1 to Point 2. The figure is a side view of an arbitrary round "Turbulent Body," or vortex as it is known. The rectangle 80 in FIG. 8 is the control surface which is round in the plane perpendicular to the drawing, since the vortex is assumed to be round in this plane. Thus, the outer control surface is a cylinder, and a cross section of a round turbulent body in a flow field direction to be used for a control volume calculation is illustrated. This shape is chosen for ease of visualization. Point 1 is defined as being immediately upstream of where flow is unaffected by the vortex, and where pressure and velocity are equal to the non-turbulent values. Point 2 is where the maximum area of the vortex occurs. The vortex exerts forces that produce momentum perpendicular to the flow direction and the turbulent body conforms to pressure lines. The centrifugal pressure forces are balanced with the pressure caused the curvilinear flow velocity acting on the surface of the vortex.

Such a shaped body results in a net sum of zero forces acting over its surface. The rectangle 80 in the figure indicates the boundary or surface of the effected flow field and the free stream flow. Pressure on both the top and bottom of this control volume (or the rectangle 80 in the figure) are equal and opposite. Thus, those pressures cancel one another and can be ignored. The calculation will refer to the surface of the portion of the effected flow field, the portion in the rectangle in FIG. 8, as the "control surface" (cs).

This cs bounds a stream tube within the infinite flow field where the total energy in the stream tube (Sum of kinetic, potential, gravitational, internal, etc.) is equal to a constant. Also, the mass flow within the cs is a constant. There is no flow across the cs boundary, thus the vortex must be shaped so that mass flow rate (density times area times velocity) equals a constant and outward inertial forces are balance with inward dynamic pressure forces. Beyond this effected flow area, the flow field is assumed to have the same velocity as the infinite flow field. A large pressure/velocity gradient exists along the outer portion or outside surface of the cylindrical control surface. Further, it is assumed that little or no momentum and energy transfer occurs across this part of the surface since the total energy across the boundary is constant. Therefore, there are no forces to consider across this part of the outer (surface parallel to the flow) of the control surface. Friction on the surface of the vortex is ignored, and viscosity within the fluid is ignored, as the Reynolds number is large so inertial forces far exceed viscous, and thus viscous forces can be ignored.

A Mass Analysis yields:

mass flow rate 1=mass flow rate 2 (Equation 84)

Where "mass flow rate 1" is the flow's mass into the cs from the left in FIG. 8 and "mass flow rate 2 is the mass leaving the cs (the right side of FIG. 8).

Since mass flow rate equals:

density ($\rho$) times Area ($A$) times Velocity ($V$) (Equation 85)

Equation 84 becomes:

$\rho_1 A_{cs} V_1 = \rho_2 (A_{cs} - A_b) V_2$ (Equation 86)

If $V_1$ and $V_2$ are much less than the sonic velocity, or density is constant, then $\rho_1$ and $\rho_2$ will be nearly equal and the $\rho$ on both sides of the equation may be divided out, and thus Equation 86 can be written as:

$A_{cs} V_1 = (A_{cs} - A_b) V_2$ (Equation 87)

Solving Equation 87 for Acs yields:

$$A_{cs} = \frac{A_b V_2}{V_2 - V_1}$$ (Equation 88)

A momentum analysis may be used to solve for $P_2$. The momentum equation is:

$$\sum F = \frac{dB}{dt} + \sum V_{eme} - \sum V_{imi}$$ (Equation 89)

In Equation 89, Ve is the velocity of the mass (me) exiting the Control Surface (cs), and Vi and mi are the stream properties of the flow going into the cs. Since the flow is steady dB/dt=zero, Equation 89 becomes:

$P_1 A_{cs} - P_2 (A_{cs} - A_b) = \rho A_{cs} V_1 (V_2 - V_1)$ (Equation 90)

It is noted that the terms on the left side of Equation 90 represent the pressure acting on the left face of the cs times its area minus the pressure acting on the right face times its area, so this is the sum of the forces on the cs. On the right side of Equation 90 are the momentum terms for each stream into and out of the cs. Also, the static pressure (no flow pressure) is the same at point 1 and 2, and therefore cancels out, leaving $P_1$ and $P_2$ as the dynamic head.

Substituting the mass analysis equation for Acs in Equation 90, and solving for $P_2$ yields:

$$P_2 = \frac{\rho V_2^2 + \rho V_1^2 V_2 + P_1 V_2}{V_1}$$ (Equation 91)

An energy analysis may be used to solve for $P_2$. The energy equation is:

$Q - Ws = \Sigma cs (P/\rho + V^2/2 + gz + u) m$ (Equation 92)

In Equation 92, Q (the rate of heat transfer) minus Ws (the rate of shaft work performed) equals the sum of the potential, kinetic, gravitational, and internal energies of the streams times the mass flow rate (m) entering and exiting the control surface.

Since there is no heat transfer and shaft work, these terms are zero, and gravitational energy will be assumed equal as is the internal energy of the flow upstream and at the maximum area of the bluff body. Thus, the energy equation may be written as:

$$P_2 = \rho \left| \frac{V_1^2}{2} - \frac{V_2^2}{2} \right| + P_1$$ (Equation 93)

Setting the results of the momentum and energy analysis equal to each other ($P_2$ from the momentum analysis equals $P_2$ from the energy analysis) yields the following quadratic equation for $V_2$:

$$0 = \left[\frac{\rho V_1}{2}\right] V_2^2 - [\rho V_1^2 + P_1] V_2 + \left[P_1 V_1 + \frac{\rho V_1^3}{2}\right]$$ (Equation 94)

The solution of a quadratic equation takes the following form:

$$x = \frac{-b \pm \sqrt{b^2 - 4ac}}{2a}$$ (Equation 95)

Thus, the variables may be represented as the following:

$$a = \left[\frac{\rho V_1}{2}\right]$$ (Equation 96)

$$b = [\rho V_1^2 + P_1]$$ (Equation 97)

$$b^2 = \rho^2 V_1^4 + 2\rho V_1^2 P_1 + P_1^2$$ (Equation 98)

$$c = \left[P_1 V_1 + \frac{\rho V_1^3}{2}\right]$$ (Equation 99)

$$4ac = 4\left[\frac{\rho V_1}{2}\right]\left[P_1 V_1 + \frac{\rho V_1^3}{2}\right] = 2\rho V_1^2 P_1 + \rho^2 V_1^4$$ (Equation 100)

-continued $$b^2 - 4ac = P_1^2 \quad \text{(Equation 101)}$$

$$V_2 = \frac{-[\rho V_1^2 + P_1] \mp \sqrt{P_1^2}}{\rho V_1} \quad \text{(Equation 102)}$$

Since $P_1$ equals $\rho V_1^2/2$, Equation 102 may be written as:

$$V_2 = \frac{-\left[\rho V_1^2 + \frac{\rho V_1^2}{2}\right] \mp \sqrt{\left|\frac{\rho V_1^2}{2}\right|^2}}{\rho V_1} \quad \text{(Equation 103)}$$

$$V_2 = -\left|V_1 + \frac{V_1}{2}\right| \mp \frac{V_1}{2} \quad \text{(Equation 104)}$$

$$V_2 \text{ equals} - V_1 \text{ or } -2V_1 \quad \text{(Equation 105)}$$

The solution in the form of Equation 105 is an important concept. First, the static pressure is the same at both point 1 and point 2, i.e., when there is no flow the pressure is the same at both points 1 and 2; thus, the static pressure ($P_0$) for the infinite flow field is always acting at $P_1$ and $P_2$. Second, the total energy is the same at point 1 and 2 (since no friction is assumed); thus, any solution to this problem will be a function of the Velocity at point 1 or pressure change due to this velocity. Dynamic head (stagnation pressure minus kinetic pressure depression) is related to this velocity by Bernoulli's equation so, $P_1$ equals $\rho V_1^2/2$ and $P_2$ equals $\rho V_2^2/2$. When $\rho$ and $V_1$, are set equal to one, $P_1$ equals $\rho V_1^2/2$ which equals ½. The equation above has two solutions 1 and 2. $V_1$ is a velocity difference between zero and $V_1$, and the equation returns a velocity difference between point 1 and point 2 which is $V_2$ minus $V_1$. Thus the velocities at point two are $2V_1$ or $3V_1$. For other values of $\rho$, $V_1$, and $P_1$, it has been discussed that $P_1$ and $P_2$ are pressure depressions and are thus a function of $V_1$. When the 2V solution occurs, the flow accelerates to 2V and the area of the $A_{cs}$ is twice the area of the body or vortex. For the 3V solution, the flow accelerates to three times the initial velocity and Acs is 1.5 times $A_b$, or the vortex diameter. The outer diameter of the control surface is 1.225 times the hydraulic diameter of the bluff body. The thickness of the high-speed flow around the vortex is 0.1125 times the diameter of the vortex. A compressible flow in this balanced configuration will not accelerate to $2V_1$ or $3V_1$. Due to the pressure drop, density will be less so velocity will change and the area of the Cv will change to move the same mass at points one and two. Compressibility will also have an effect on the shape that conserves the force balance as the density changes along the body.

The 2V solution has been observed to occur when a "body" or vortex: is totally immersed in a flow. The 3V solution has been observed at the interface between two greatly differing density fluids. For example, leaves pass a canoe at the 3V velocity when they are near the hull and on the surface of the water. The 3V solution may also occur when two vortexes are near each other. Additionally, this analysis assumes no energy and momentum are lost across the outer control surface. In reality, "diffusion" occurs to the flow on the other side of the control surface. The dynamic pressure depression accelerates flow on the other side of the control surface which accelerates some flow beyond that, etc. The result is a logarithmically decaying pressure and velocity field around the vortex. The control volume bounds half of the kinetic energy added to the flow field. Nevertheless the resistance caused by the presence of the vortex will be directly related to the resistance of control volume. How far before and after the center of the vortex the control volume extends will have to be determined and may depend on velocities.

The following description outlines the implementation, or process, of a numerical solution of these equations. The curvilinear/linear portion of the flow will be modeled using stationary elements that can be divided and combined. The power equation for this type of flow is:

$$\frac{\Delta P}{Q} = \frac{q - W}{VQ} - \rho \frac{\delta v}{A} - \frac{\mu A_\perp dv_\perp}{AQ} - \frac{\rho A_h g \delta h}{AQ} \quad \text{(Equation 106)}$$

For three dimensional flows, where no work or heat transfer occurs and the density is constant, the power equation can be written for each direction:

$$\frac{\Delta P_x}{Q_x} = \rho \frac{\delta v_x}{A_x} - \frac{\mu A_{\perp x} dv_{\perp x}}{AQ_x} - \frac{\rho A_h g \delta h_x}{AQ_x} \quad \text{(Equation 107)}$$

$$\frac{\Delta P_z}{Q_z} = \rho \frac{\delta v_z}{A_z} - \frac{\mu A_{\perp z} dv_{\perp z}}{AQ_z} - \frac{\rho A_h g \delta h_z}{AQ_z} \quad \text{(Equation 108)}$$

$$\frac{\Delta P_y}{Q_y} = \rho \frac{\delta v_y}{A_y} - \frac{\mu A_{\perp y} dv_{\perp y}}{AQ_y} - \frac{\rho A_h g \delta h_y}{AQ_y} \quad \text{(Equation 109)}$$

As an example, consider a long pipe with a fully developed velocity profile in the x direction. The pipe can be modeled with one resistor in the x direction. Suppose that a ninety degree elbow in the x-y plane is at the end of the pipe. As the flow approaches the elbow, velocity in the y direction will occur. The model will need an array of both x, y and z resistors added to capture this motion. After the elbow the flow will be in the y direction and one "y" resistor will capture the physics of interest. Since the actual velocity profile in the pipe will have an effect on flow changes that the elbow causes, the resistor array should also be upstream of where the effects of the elbow start to capture the actual motion, the velocity profile, in the pipe before the elbow.

Portions of the flow that are in a turbulent or rotating pressure balanced state, a vortex, will be treated as a resistor array that moves in both space and time within the non-rotating flow.

$$\frac{\Delta P}{Q} = \frac{q - W}{VQ} - \rho \frac{\delta v}{A} - \frac{\mu A_\perp dv_\perp}{AQ} - \frac{\rho A_h g \delta h}{AQ} + Fr \frac{\omega}{Q^2} - \rho r^2 \frac{\omega^2 - \omega_0^2}{2Q} \quad \text{(Equation 110)}$$

The resulting resistor array from the above equation also includes the control volume around the eddy, and it too can be written for each principle direction. Thus the linear resistor array may be rearranged for each time interval to model the slower motion of the eddy. Similarly, should the pressure drop below saturation pressure of the liquid, a bubble resistor array could be added to the model for the physics of the presence of a vapor bubble in the flow. For example, if the fluid were blood, then a resistor array with a "platelet" or solid could be added to the resistor array where appropriate.

The resistor array could be conformed to moving boundaries or geometries. A flapping bird wing, an elastic duct, blood vessels such as an artery or vein in a pulsating flow, etc., could be modeled by adjusting the array at each time period. The fineness of the resistor array can be varied to suit the velocity gradients in a model. For example, in a model of flow over an air foil a large volume of diffused velocity occurs over the top of the foil. A very coarse resistor array can adequately capture this motion. The velocity gradients will determine the resolution of the array required to capture the flow motion. Conservation of mass, momentum, and energy can be easily verified by summing all of the flow in the array perpendicular to the average flow plane.

Thus, according to various example embodiments of the present general inventive concept, the method may combine elements of Eulerian $u(x(t),t)$ and Lagrangian $U(x_o,t)$ flow field specifications. Eulerian elements could be for portions of the flow with symmetric $\tau$, and Lagrangian elements for asymmetric $\tau$ portions that are rotating. In other example embodiments, the flow field may be viewed strictly from the Lagrangian view, with the vortexes moving at a slower speed than the remainder of the flow. In either of those particular cases, the flow field will be discontinuous.

As an over view, in the present general inventive concept Tau ($\tau$), the sum of the torques acting on an element, may be used as a test for combining and breaking up an element's gradient. Tau is a result of a velocity gradient. In other words, Tau is produced by a velocity gradient, so they are one and the same. If Tau is symmetric (zero) for an element and also for one or more of its neighboring elements, these elements can be combined into a larger single element, or an array, for the modeling, as the velocities of the neighboring resistors are the same. If $\tau$ is asymmetric or non zero, and reaches a predetermined amount (for small asymmetric $\tau$ the traditional way of using viscous shear increases to simulate small turbulence may be more efficient), a rotational surface element may be added in the middle of the face with the highest shear stress. Since the resistance of an element is linear, the pressure and velocity gradient in an element will be linear too, and this allows the simple calculation of the pressure across the new element and the velocity in it.

Figure 9:
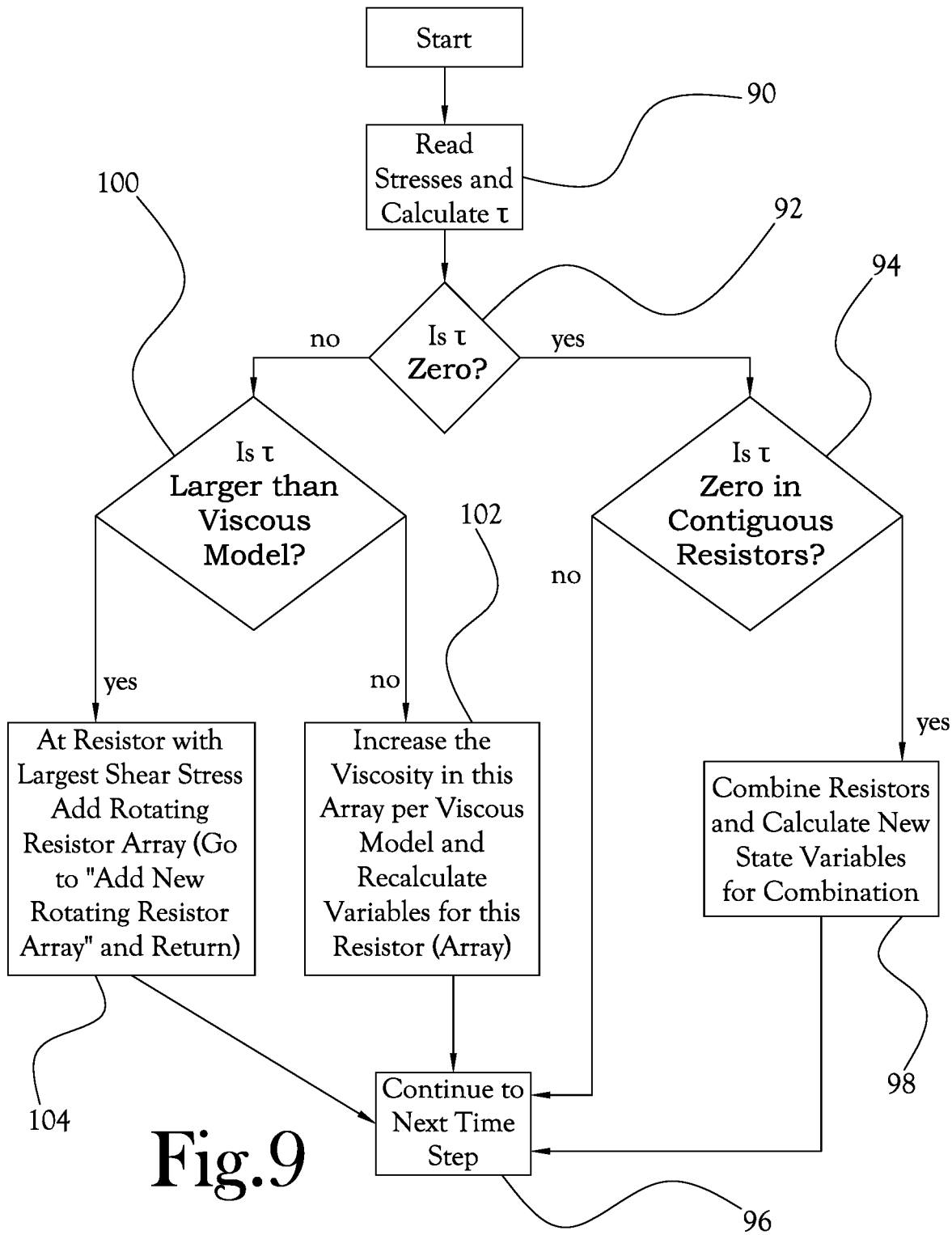
FIGS. 9-11 are flow charts illustrating operations involved in calculating velocity and pressure across an element according to an embodiment of the present general inventive concept.
Figure 10:
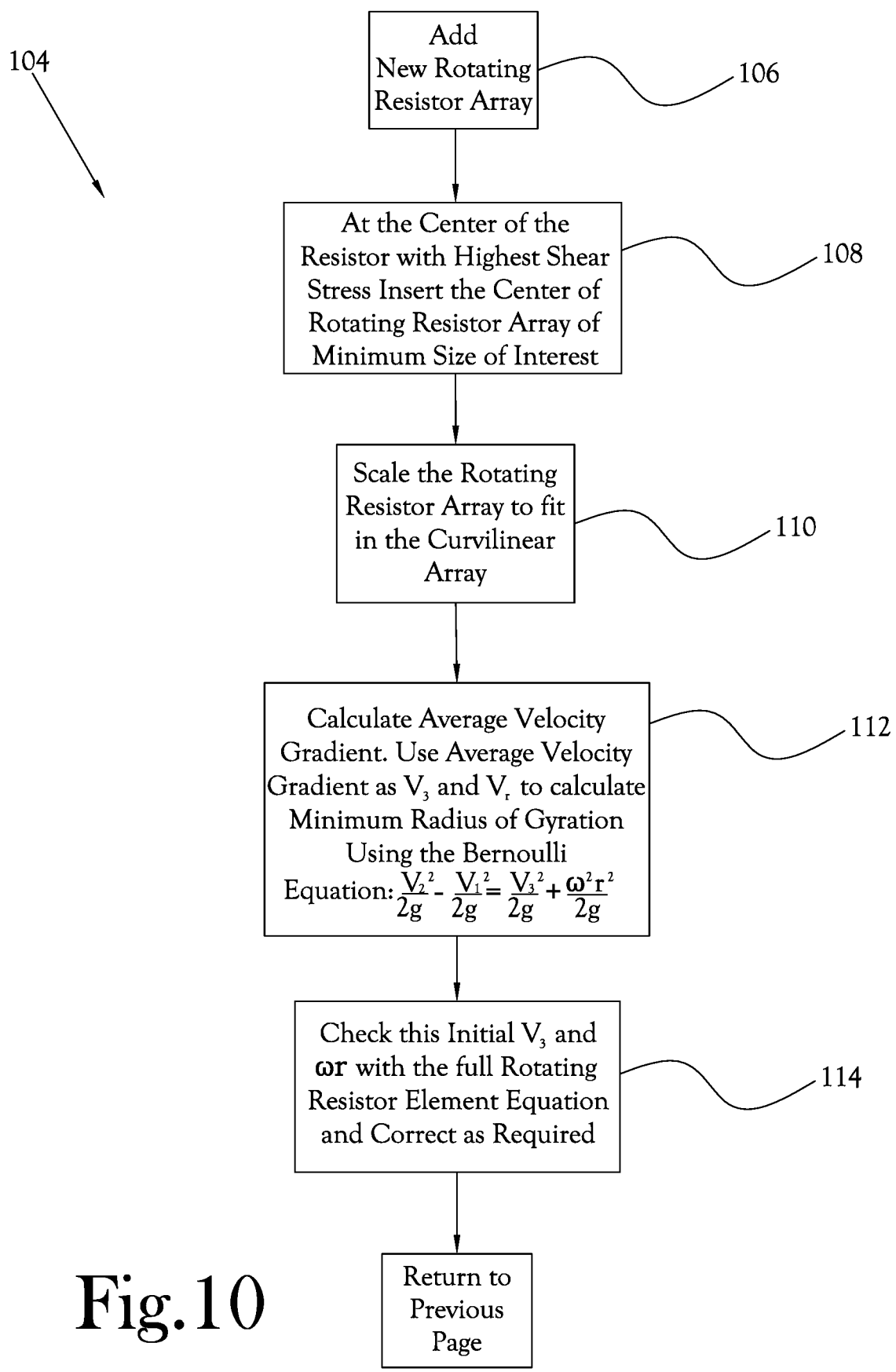
Figure 11:
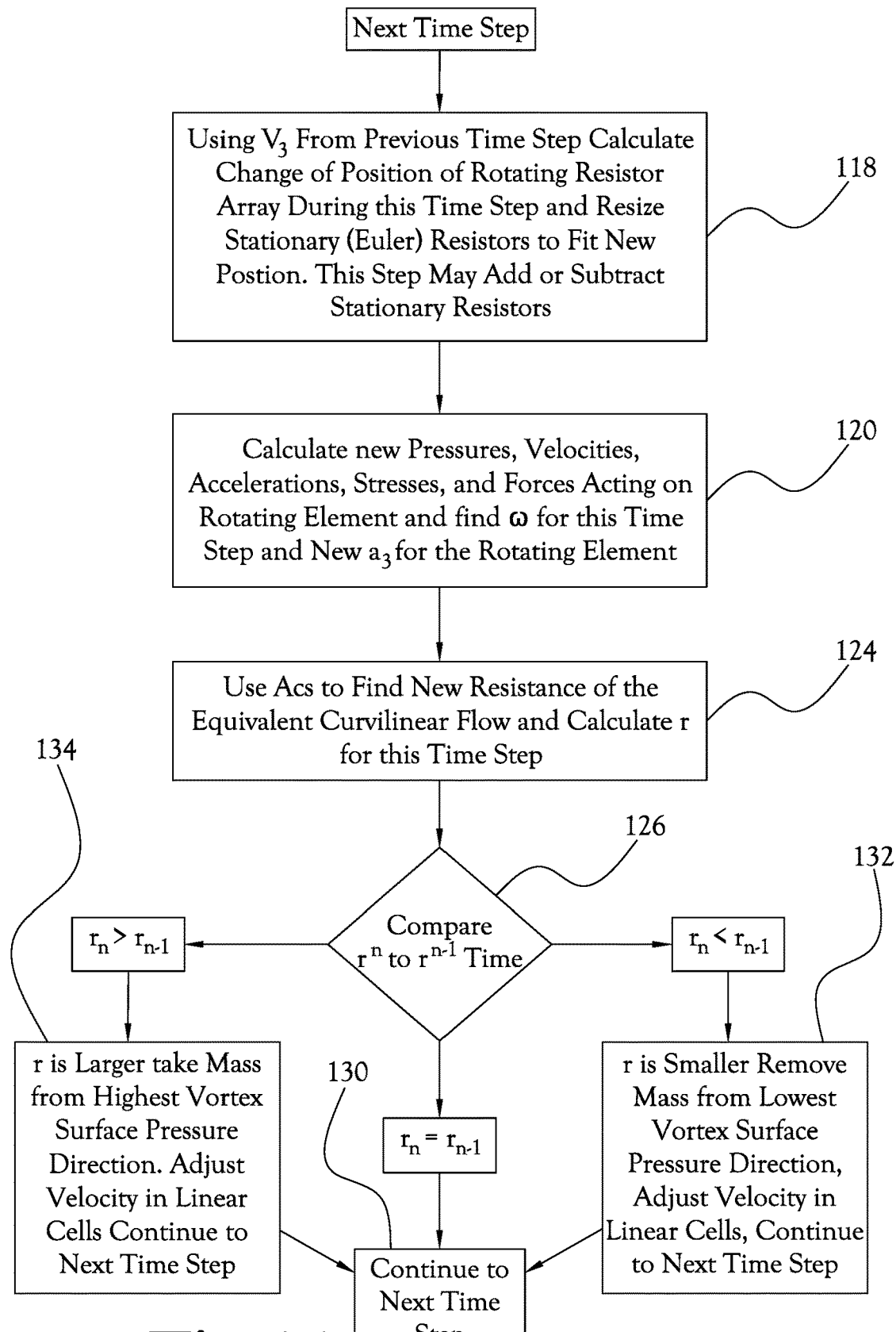

FIGS. 9-11 are flow charts illustrating operations involved in calculating velocity and pressure across an element according to an embodiment of the present general inventive concept. Beginning with FIG. 9, in operation 90, the stresses on an element, e.g., a resistor or resistor array, are determined to calculate $\tau$. In various example embodiments, a model will have boundary conditions and a specified geometry, such as, for example, inlet flow, outlet pressure, a mesh of an airfoil in a "wind tunnel," etc. From such inputs initial cells, or elements, or resistors, can be created and used as the seed mesh. In operation 92, it is determined whether $\tau$ is equal to zero. If $\tau$ is equal to zero, in operation 94 it is determined whether $\tau$ is equal to zero in contiguous resistors. If $\tau$ is not equal to zero in the contiguous resistors, the analysis moves to the next time step in operation 96. If $\tau$ is found to be equal in contiguous resistors, in operation 98 the resistors in which $\tau$ is equal are combined into a resistor array, new state variables are calculated for the combined resistors, and the analysis moves to the next time step in operation 96. Such state variables as temperature, pressure, velocity, stress, density (if the flow is compressible, for incompressible flow density is not a state variable, but a constant), rotation, acceleration, etc., are functions of the conditions affecting the resistor. In Navier-Stokes CFD rotation, rotational velocity, and rotational acceleration are not state variables. Generally, one could change from Cartesian coordinates to Polar coordinates and write the Circulation Integral. One advantage of the present general inventive concept is that it allows both domains to exist together, yielding larger volumes of fluid per element.

Thus, if neighboring cells have no rotation they can be combined without losing information on the flow state. A characteristic of a fluid is that at rest it cannot exert a shear stress. It will conform to the boundary conditions, such as the container it is in. Fluids can develop shear stress in a velocity gradient, and it may be determined by measuring the torque required to turn a rotating cylinder immersed in the fluid. For portions of the flow with no velocity gradient there is no shear stress imbalance, and no need to have individual resistors. The fluid molecules may be being modeled on a macroscopic level. Considering velocity gradients this small is not important to macroscopic motion for many portions of a flow field when it is laminar. Viscous effects can be modeled by a linear force on an element that is based on velocity gradient and shear stress imbalanced. Conventional CFD models consider velocity gradients and resulting asymmetric $\tau$ through the formula $$F = dv_\perp \frac{\mu}{\rho g} \frac{A_\perp}{A},$$

which is a false curvilinear force on the fluid element. Such an approach does not work well when the velocity gradient becomes large and lasts for a long period of time. A part of the flow will spin and act like a snowball rolling down a snowy slope. This rotating flow will grow and grow relative to the other flow around it. The "snowball" becomes an object the surrounding flow must move around. This causes addition resistance which purely linear models have difficulty capturing without resorting to DNC. A further development of this modeling technique is deciding what level of velocity gradient is large enough to require the rotating element. Thus, the present general inventive concept is able to model resistors and resistor arrays in a far more efficient manner that does not tax the resources of a computer in the way that conventional methods do. By improving operation of the computer, modeling can be done in both a faster and more efficient manner, as well as more accurately.

If it is determined in operation 92 that $\tau$ is not zero, in operation 100 it is determined whether $\tau$ is larger than the viscous model. If $\tau$ is not larger than the viscous model, in operation 102 the viscosity is increased in the resistor (array) per the viscous model, and the state variables are recalculated for the resistor (array). If $\tau$ is determined to be larger than the viscous model, in operation 104 a new rotating resistor array is based at the resistor face with the largest shear stress. In various example embodiments of the present general inventive concept, a turbulence energy is calculated based on an asymmetric $\tau$. The turbulence energy may then be subtracted from the energy equation portion of the simultaneous solution of the momentum and energy equations. The result is that rotating energy is consumed but it is not returned downstream as the rotating energy converts to curvilinear.

Turning to FIG. 10, which illustrates operation 104 of FIG. 9, in operation 106 a new rotating resistor array is added to the model. In operation 108, the center of the new rotating resistor array with a minimum size of interest is inserted at the center of the resistor face with the largest shear stress. Operation 110 entails scaling the rotating resistor array to fit in the curvilinear array. In operation 112, the average velocity gradient is calculated. The average velocity gradient is used as $V_3$ and $V_1$ to calculate the minimum radius of gyration using the Bernoulli Equation. In operation 114 this initial $V_3$ and ωr are checked with the full rotating resistor element equation, and corrected as required. Upon completion of operation 104, the modeling moves to the next time step in operation 96.

FIG. 11 illustrates the operations involved after continuing to the next time step in operation 96. In operation 118, $V_3$ from the previous time step is used to calculate a change of position of the rotating resistor array and to resize stationary (Euler) resistors to fit the new position. Stationary resistors may be added or subtracted during this operation. In operation 120 new pressures, velocities, accelerations, stresses, and forces acting on the rotating element are calculated, and ω is determined for the current time step, as well as a new $a_3$ for the rotating resistor array. In operation 124 Acs is used to find the new resistance of the equivalent curvilinear flow, and τ is calculated for the current time step, to account fo the increase in resistance due to the presence of the vortex. In operation 126, r of the current time step is compared to the r of the previous time step. If r of the current time step is equal to r of the previous time step, the process continues to the next time step in operation 130. If r of the current time step is less than r of the previous time step, in operation 132 mass is removed from the lowest vortex surface pressure direction, velocity is adjusted in linear cells, and the process continues to the next time step in operation 130. If r of the current time step is more than r of the previous time step, in operation 134 mass is taken from the highest vortex surface pressure direction, velocity is adjusted in linear cells, and the process continues to the next time step in operation 130.

From the foregoing, the mathematics of the discussed physics is similar to a language; the same thing can be said in several ways. The above development of the conservation equations can be done using calculus, and this too has several forms. A model can have stationary elements or ones that move with the fluid. The calculation can move into the flow or along with it at a faster rate (upwind versus downwind). The time steps between each calculation may be of different quantities according to various example embodiments of the present general inventive concept. Similarly, methods for establishing how many elements (resistors) to start the analysis with may vary according to various example embodiments of the present general inventive concept. Numerical techniques to divide and recombine the elements in a flow field may vary according to various example embodiments. The most economical method to calculate the rotational balance and when and in what direction it breaks down may vary according to various example embodiments. Unlike the conventional methods, the various example embodiments of the present general inventive concept do not over use computer resources nor fail to model the flow with enough resolution to capture its essence. Various example embodiments of the present general inventive concept may include features in a computer modeling program to calculate temperatures due to frictional losses, heat transfer within the flow field, the effects of compressibility, etc.

To model a flow field using the least amount of computer resources, a computer model that divides a flow field into elements which contain information on both position in space and rotational position of the elements over time is provided by various example embodiments of the present general inventive concept. Such a model may then use various forms of conservation of mass, conservation of momentum, energy, power, the laws of motion, and, if needed, higher order time and space derivatives of Newton's Law to calculate the change in spatial and rotational position over a time period as the element is acted on by forces and moments in the flow field. By performing this calculation over and over in time, the conditions of a flow can be found both instantaneously and averaged. This flow field data can then be used to find important information such as, for example, drag and lift on an object. Similarly, internal flows could be modeled to find pressure loss for a given flow, etc.

The numerical implementation of the power equations and the process of adding resistor arrays could be carried out in many different ways in different example embodiments of the present general inventive concept. Software could be written with a "library" of resistor array types for easy and fast selection for modeling. In various example embodiments, such a library may include, for example, a moving vortex array, a stationary vortex array, a bubble (two phase) array, a suspended solid array, a droplet array, an array which captures the physics of rarefied flow regions, etc. The ability to average a flow, removing detail and computational burden, and then recovering that detail with a resistor array is a vast improvement of utilizing the computer's resources over conventional modeling methods/processes. Various example embodiments of the present general inventive concept allow a model to compute details of interest and have minimal computational burden for areas of little to no interest that yet have an effect on the actual areas of interest.

To further expand on the advantages of the modeling methods enabled by the present general inventive concept, consider a projectile such as a bullet. A high power rifle bullet leaves the rifle barrel at nearly Mach 3 (three times the speed of sound) and with a high rate of rotation imparted by the rifling. Rotation may cause a weak aerodynamic force if there is a wind. As the projectile moves further down range, aerodynamic forces consume the rotational and linear momentum of the projectile while gravity acts on the flight path. When the projectile is moving faster than the speed of sound a compression wave or shock wave develops near the leading edge. Across the shock wave the gases compress rapidly and a large temperature rise occurs. Flow behind this shockwave and just ahead of the projectile is subsonic and at a higher temperature than the free stream conditions. This pressure rise is due to aerodynamic drag forces which produce a pressure increase ahead of the projectile, and since air is a gas and roughly conforms to the ideal gas law (PV=nRT), the air in the control volume around the projectile experiences a temperature rise due to the work of compression. A low pressure zone forms behind the projectile that tends to cool the flow. Finding the shape of a projectile which loses the least amount of velocity in all of these flow conditions is not an easy task. A CFD model that includes rotating elements and conserves a flow variable that spans both time and space (power) will produce more accurate results. Additionally, since power is linear with flow rate, the stability of this model will be much better than preceding ones.

Another example of how the modeling methods of the present general inventive concept can produce more efficient designs is the problem of designing a pier. The designer must understand both wind and wave loads on the structure. Since piers have support columns which are repetitively spaced, downstream columns will be in the turbulent wake of upstream elements. In addition, the wind and waves interact. Understanding these fluid dynamic forces is vital for designing a structure which will meet the intended purpose with the least material costs. A CFD model that captures the rotational and linear behavior of the fluid will provide load data for the optimum design. Such a pier design uses the least materials yet performs the intended function under all design conditions.

As yet another example, exhaust flow in an internal combustion engine is also difficult to model with traditional CFD. Flow varies cyclically with time based on the exhaust valve opening. Flow varies from zero, to sonic, to supersonic, and at an elevated temperature with heat transfer to ducting and structures. Finding the design of an exhaust system that takes advantage of the cyclic nature of the exhaust flow would be much easier with a CFD model that is self-meshing and contains all of the physics of the flow while minimizing the use of computation resources.

The three foregoing examples demonstrate the process of how the physics and mathematics developed in the present general inventive concept are used to solve real world design problems. A host of other problems is endless and could also be similarly discussed, such as blood flow in the circulatory system, reducing head loses in a piping system, flapping wings of a bird, acoustic and flow noise transmission and reflection, plasma modeling in fusion reactors, etc.

Various example embodiments of the present general inventive concept provide a method of tracking both the curvilinear and rotational position of elements of a flow field in both space and time. Using the variable τ, which is the sum of the moments on an element, it may be determined if elements should be combined, if rotational elements should be added, or if the viscosity should be adjusted. These elements may be viewed and used as being analogous to resistors in and electrical circuit. Such modeling allows an economical combination of various bits of information that may be utilized in computer modeling to greatly improve the performance of the computer, due to combining various flow elements into easier analyzed resistor "elements" that require less processing for small particles/processes that nevertheless may affect the larger flow analysis. A computer implemented method according to the present general inventive concept may use the conservation of power to linearize the conservation equations, making the manipulation of flow field resistance simpler than conventional methods. Use of the control volume approach to provide the radius of a vortex, and computer implementation of the resistance change due to the presence of a vortex in a flow field, provides enhanced information while at the same time taxing computer resources less than conventional methods which produce less information. The present general inventive concept includes a modeling process that is specifically designed to achieve an improved technological result over the traditional methods discussed herein and used in conventional industry practice by modeling vortexes and other flow discontinuities as resistor elements to lower the burden on computer resources used in the modeling, resulting in improved performance by the computer during the modeling, not to mention better information produced at a faster and more efficient rate.

Various example embodiments of the present general inventive concept provide a method, which may be computer-implemented, for characterizing fluid flow and acoustic transmission of energy in a computational fluid dynamics model space that tracks both linear and rotational position of the modeled flow in the model space, the method including modeling flow with at least one flow resistor, where the resistance is calculated using the conservation of power equation, which determines in the model space either pressure differential or volumetric mass flow rate at points of interest; simulating the effects on the flow caused by velocity, area, elevation, heat transfer, work, density, frictional, and acceleration changes due to geometry, boundary, and other model givens including any motion of these givens in the model by adding, as required, additional resistors both in series and parallel forming an array which captures the essence of the flow field characteristics induced by these model parameters; simulating discontinuities in the flow brought about by entrained solids, bubbles, droplets, and vortices by adding resistors arrays with the appropriate resistor control volume type; modeling the movement of these discontinuities in the flow by choosing an appropriate time interval, calculating the velocity of the discontinuity using the control volume method, and inserting into the resistor array this resistance volume, and calculating instantaneous resistance and then moving the discontinuity resistance volume to the next position as prescribed by the time interval and discontinuity velocity, and finding the resistance for the new time interval repeating this operation over the desired total time; simplifying the model in areas where velocity, area, elevation, heat transfer, work, density, frictional, and acceleration changes have reached a steady state by adding equivalent individual resistors to form larger resistors or resistor arrays in the model space, thereby conserving computational resources; and verifying conservation of mass, momentum and energy at points in the model as required at points of interest.

The method may further include storing, in a computer-accessible memory, a first set of state vectors for resistors in the fluid region of the model using an algorithm that establishes an initial resistor array based on given initial conditions, boundary, and geometry of the model. The method may further include calculating the resistor average velocity using the appropriate conservation equation(s), i.e., mass, momentum, or energy, and finding each resistor and the overall model flow state. The method may further include comparing the average velocity in neighboring resistors, and if the difference is smaller than a predetermined threshold, adding them together, and if the difference is larger than a predetermined threshold, replacing the resistor(s) with more resistors to create an array that better resolves the physics of the flow. When the volumetric density of resistors reaches a predetermined amount, a vortex resistor array may be added to capture the effect on the flow caused by the discontinuity of the vortex. The method may further include solving the power form of the forces and torques acting on the vortex array and calculating an eddy diameter which conserves power and energy for the vortex in the control volume. The method may further include updating the resistor array for the new control volume size and vortex vector state matrices. The method may further include re-computing model and resistor array flow and pressure drop and updating all resistor vector matrices. The method may include using a time step small enough to resolve the motion of the smallest vortex of interest, calculating new positions for vortices, and updating vector matrices for the resistor array. The method may include continuing this iterative process in time and space until average values are found and the physics of the fluid flow are fully modeled.

Various example embodiments of the present general inventive concept may provide a method of constructing a body to optimize a fluid flow over a surface of the body, the method including defining a control volume in which a fluid flow moves over at least a portion of a surface of a body, the control volume having an inlet and an outlet, setting initial conditions in the control volume, determining flow profiles of areas between the inlet and outlet of the control volume, identifying flow elements associated with changes in flow fluid velocity, assigning flow resistors to the flow elements associated with the changes in flow fluid velocity, wherein resistive values of the flow resistors correspond to flow characteristics causing the changes in flow fluid velocity, determining new conditions according to the flow resistors in the control volume for a desired number of subsequent time intervals, including adjusting the flow resistors according to the new conditions of each time interval to reflect changes in the flow fluid velocity, and changing parameters of the body to adjust vortexes in the fluid flow through the control volume according to the flow resistors. Such modeling may allow for a decrease in such vortexes, or other types of controlling, adjusting, etc., of the vortexes as desired in the design of the body over which the fluid will flow.

The method may further include determining a sum of moments for each of the flow resistors. At least a plurality of the flow resistors may be assigned as flow resistor arrays. Contiguous flow resistors for which respectively a sum of moments equals zero may be combined as a flow resistor array. The determined new conditions may include new pressures, velocities, accelerations, stresses, forces acting on the flow resistors, rotational velocities, or any combination thereof. The flow resistors may be adjusted according to a current area and radius of a control surface of the respective flow resistors.

Various example embodiments of the present general inventive concept may provide a method of constructing a surface to optimize a fluid flow, the method including determining dimensions of a first flow resistor of a fluid flowing over a surface, determining a sum of first moments generated by stress forces acting on the first flow resistor to identify state variables of the first flow resistor, in response to the sum of moments on the first flow resistor being zero, determining sums of moments on flow resistors contiguous to the first flow resistors, combining the first flow resistor and the contiguous flow resistors and calculating new stress forces acting on the combined flow resistors in response to the sums of moments on the contiguous flow resistors being zero, and proceeding to a next time step in response to the sums of moments on the contiguous flow resistors not being zero, in response to the sum of moments on the first flow resistor not being zero, determining whether the sum of moments of the first flow resistor is larger than a sum of moments on a corresponding viscous model, in response to the sum of moments on the first flow resistor being smaller than the sum of moments on the viscous model, increasing a viscosity of the first flow resistor and recalculating state variables for the first flow resistor, and proceeding to the next time step, in response to the sum of moments on the first flow resistor being larger than the sum of moments on the viscous model, adding a rotating resistor array to a face of the first flow resistor having a largest shear stress by performing operations including inserting the rotating resistor array at the center of the face of the first flow resistor having the largest shear stress, the rotating resistor array configured to a minimum size of interest, scaling the rotating resistor array to fit in a curvilinear array, calculating an average velocity gradient of the rotating resistor array, adjusting rotational velocity and radius of rotating resistor array according to initial conditions, and proceeding to the next time step, determining next time step values by performing operations including calculating a change of position of the rotating resistor array and resize stationary flow resistors to fit new position, calculating new moments of state variables acting on the rotating resistor array to determine current rotational velocity and acceleration of the rotating resistor array, determining current resistance of equivalent curvilinear flow and calculating a current vortex radius for the current time step, comparing the current vortex radius of the current time step with a previous vortex radius of the previous time step, removing mass from a lowest vortex surface pressure direction and adjusting velocity in linear flow resistors in response to the current vortex radius being smaller than the previous vortex radius, removing mass from a highest vortex surface direction and adjusting velocity in linear flow resistors in response to the current vortex radius being larger than the previous vortex radius, and repeating the operations of determining next time step values until a predetermined number of time steps have been analyzed, modifying the surface to adjust vortexes in the fluid flow over the surface according to the values determined in the predetermined number of time steps.

Various example embodiments of the present general inventive concept may provide a method of constructing a body to optimize a fluid flow over a surface of the body, the method including setting a control volume in which to model a fluid flow, modeling the fluid flow in the control volume using at least one flow resistor representing a fluid flow element, where a resistance of the at least one flow resistor is calculated using a conservation of power equation, which determines a pressure differential or volumetric mass flow rate at points of interest in the control volume, simulating effects on the modeled fluid flow caused by one or more model parameters, adding additional flow resistors to form a flow resistor array according to flow field characteristics induced by the simulated effects, simulating discontinuities in the modeled fluid flow caused by entrained solids, bubbles, droplets, and vortices by adding flow resistors array with a corresponding resistor control volume, modeling movement of the simulated discontinuities in the flow by selecting a time interval, calculating the velocity of the discontinuity using the control volume method, and inserting into the resistor array the resistance control volume, calculating instantaneous resistance, then moving the discontinuity resistance volume to a next position as prescribed by the time interval and discontinuity velocity, and finding a resistance for the new time interval by repeating this operation over the desired total time, simplifying the model in areas where velocity, area, elevation, heat transfer, work, density frictional, and acceleration changes have reached a steady state by adding identical individual flow resistors to form larger flow resistors in the model space, verifying conservation of mass, momentum, and energy at points in the model at points of interest, and modifying the surface to adjust vortexes in the fluid flow over the surface according to the values determined in the desired total time. The method may further include storing a first set of state vectors for flow resistors in the fluid region of the model using an algorithm that establishes an initial resistor array based on given initial conditions, boundary and geometry of the model. The method may further include calculating the flow resistor average velocity using corresponding conservation equations to find each of flow resistors and the overall model flow state. The corresponding conservation equations may include mass, momentum, and energy. The method may further include comparing an average velocity in neighboring flow resistors, adding the neighboring flow resistors together in response to a compared difference being smaller than a predetermined threshold, and replacing the neighboring flow resistors with more flow resistors to create a new array in response to a compared difference being larger than a predetermined threshold. The may further include solving a power form of the forces and torques acting on the vortex array and calculating an eddy diameter which conserves power and energy for the vortex in the control volume. The method may further include updating the resistor array for the new control volume size and vortex vector state matrices. The method may further include recalculating model and flow resistor array flow and pressure drop, and updating all flow resistor vector matrices. The method may further include utilizing a time step small enough to resolve a motion of a smallest vortex or interest, and calculating new positions for vortices and updating vector matrices for the flow resistor array. The model parameters may include velocity, area, elevation, heat transfer, work, density, frictional, acceleration, or any combination thereof. The model parameters may change according to geometry and boundaries of the model space. The flow resistors may be modeled both in series and in parallel.

Various example embodiments of the present general inventive concept may provide a method of constructing a surface to optimize a fluid flow, the method including defining a control volume including at least one area of interest, setting initial conditions in the control volume, introducing a fluid flow in the control volume, determining flow profiles of areas between inlet and outlet of the control volume, determining changes in flow fluid velocity at the areas of the control volume, assigning flow resistors to the areas of the control volume according to the changes in flow fluid velocity, and modifying the surface to adjust vortexes in the fluid flow through the control volume according to the flow resistors.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

Various example embodiments of the present general inventive concept described herein may include operations performed by one or more processors, computers, etc., that are caused to perform these operations by instructions recorded on a non-transitory computer readable storage medium. Various ones of the operations and processes described and/or associated with the described various operations and processes may be performed on any of a host of devices, such as an online server, personal computer, smart phone, tablet computer, etc., or any device containing one or more processors to process such instructions.

Program instructions to perform a method described herein, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and their corresponding descriptions as provided herein. Also, the described unit to perform an operation or a method may be hardware, software, or some combination of hardware and software. For example, the unit may be a software package running on a computer or the computer on which that software is running.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A method of constructing a surface to optimize a fluid flow, the method comprising:
   determining dimensions of a first flow resistor of a fluid flowing over the surface;
   determining a sum of first moments generated by stress forces acting on the first flow resistor to identify state variables of the first flow resistor;
   in response to the sum of moments on the first flow resistor being zero, determining sums of moments on flow resistors contiguous to the first flow resistor, combining the first flow resistor and the contiguous flow resistors and calculating new stress forces acting on the combined flow resistors in response to the sums of moments on the contiguous flow resistors being zero, and proceeding to a next time step in response to the sums of moments on the contiguous flow resistors not being zero;
   in response to the sum of moments on the first flow resistor not being zero, determining whether the sum of moments of the first flow resistor is larger than a sum of moments on a corresponding viscous model;

in response to the sum of moments on the first flow resistor being smaller than the sum of moments on the viscous model, increasing a viscosity of the first flow resistor and recalculating state variables for the first flow resistor, and proceeding to the next time step;

in response to the sum of moments on the first flow resistor being larger than the sum of moments on the viscous model, adding a rotating resistor array to a face of the first flow resistor having a largest shear stress by performing operations including:

inserting the rotating resistor array at the center of the face of the first flow resistor having the largest shear stress, the rotating resistor array configured to a minimum size of interest, scaling the rotating resistor array to fit in a curvilinear array, calculating an average velocity gradient of the rotating resistor array, adjusting rotational velocity and radius of rotating resistor array according to initial conditions, and proceeding to the next time step;

determining next time step values by performing operations including:
calculating a change of position of the rotating resistor array and resize stationary flow resistors to fit new position,
calculating new moments of state variables acting on the rotating resistor array to determine current rotational velocity and acceleration of the rotating resistor array,
determining current resistance of equivalent curvilinear flow and calculating a current vortex radius for the current time step,
comparing the current vortex radius of the current time step with a previous vortex radius of the previous time step,
removing mass from a lowest vortex surface pressure direction and adjusting velocity in linear flow resistors in response to the current vortex radius being smaller than the previous vortex radius,
removing mass from a highest vortex surface direction and adjusting velocity in linear flow resistors in response to the current vortex radius being larger than the previous vortex radius, and
repeating the operations of determining next time step values until a predetermined number of time steps have been analyzed;

modifying the surface to adjust vortexes in the fluid flow over the surface according to the values determined in the predetermined number of time steps.

2. A method of constructing an airfoil surface to optimize a fluid flow, the method comprising:

determining dimensions of a first flow resistor of a fluid flowing over the airfoil surface;

determining a sum of first moments generated by stress forces acting on the first flow resistor to identify state variables of the first flow resistor;

in response to the sum of moments on the first flow resistor being zero, determining sums of moments on flow resistors contiguous to the first flow resistor, combining the first flow resistor and the contiguous flow resistors and calculating new stress forces acting on the combined flow resistors in response to the sums of moments on the contiguous flow resistors being zero, and proceeding to a next time step in response to the sums of moments on the contiguous flow resistors not being zero;

in response to the sum of moments on the first flow resistor not being zero, determining whether the sum of moments of the first flow resistor is larger than a sum of moments on a corresponding viscous model;

in response to the sum of moments on the first flow resistor being smaller than the sum of moments on the viscous model, increasing a viscosity of the first flow resistor and recalculating state variables for the first flow resistor, and proceeding to the next time step;

in response to the sum of moments on the first flow resistor being larger than the sum of moments on the viscous model, adding a rotating resistor array to a face of the first flow resistor having a largest shear stress by performing operations including:

inserting the rotating resistor array at the center of the face of the first flow resistor having the largest shear stress, the rotating resistor array configured to a minimum size of interest, scaling the rotating resistor array to fit in a curvilinear array, calculating an average velocity gradient of the rotating resistor array, adjusting rotational velocity and radius of rotating resistor array according to initial conditions, and proceeding to the next time step;

determining next time step values by performing operations including:
calculating a change of position of the rotating resistor array and resize stationary flow resistors to fit new position,
calculating new moments of state variables acting on the rotating resistor array to determine current rotational velocity and acceleration of the rotating resistor array,
determining current resistance of equivalent curvilinear flow and calculating a current vortex radius for the current time step,
comparing the current vortex radius of the current time step with a previous vortex radius of the previous time step,
removing mass from a lowest vortex airfoil surface pressure direction and adjusting velocity in linear flow resistors in response to the current vortex radius being smaller than the previous vortex radius,
removing mass from a highest vortex airfoil surface direction and adjusting velocity in linear flow resistors in response to the current vortex radius being larger than the previous vortex radius, and
repeating the operations of determining next time step values until a predetermined number of time steps have been analyzed;

modifying the airfoil surface to adjust vortexes in the fluid flow over the airfoil surface according to the values determined in the predetermined number of time steps.

* * * * *